(12) United States Patent
Shibanuma et al.

(10) Patent No.: US 12,151,570 B2
(45) Date of Patent: Nov. 26, 2024

(54) CONTACTLESS POWER SUPPLY SYSTEM AND COIL UNIT THEREOF

(71) Applicant: DENSO CORPORATION, Kariya (JP)

(72) Inventors: Mitsuru Shibanuma, Kariya (JP);
Masaya Takahashi, Kariya (JP);
Eisuke Takahashi, Kariya (JP);
Nobuhisa Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/078,306

(22) Filed: Dec. 9, 2022

(65) Prior Publication Data

US 2023/0110224 A1    Apr. 13, 2023

Related U.S. Application Data

(63) Continuation of application No. PCT/JP2021/020396, filed on May 28, 2021.

(30) Foreign Application Priority Data

Jun. 10, 2020   (JP) ................................ 2020-100608

(51) Int. Cl.
| | |
|---|---|
| *B60L 53/122* | (2019.01) |
| *B60L 5/00* | (2006.01) |
| *H02J 50/12* | (2016.01) |
| *H02J 50/40* | (2016.01) |
| *H02J 50/70* | (2016.01) |
| *H02J 50/90* | (2016.01) |

(52) U.S. Cl.
CPC ............. *B60L 53/122* (2019.02); *B60L 5/005* (2013.01); *H02J 50/12* (2016.02); *H02J 50/402* (2020.01); *H02J 50/70* (2016.02); *H02J 50/90* (2016.02)

(58) Field of Classification Search
CPC ........ B60L 53/122; B60L 5/005; H02J 50/90; H02J 50/12; H02J 50/70; H02J 50/402
See application file for complete search history.

(56) References Cited

U.S. PATENT DOCUMENTS

| | | | | |
|---|---|---|---|---|
| 9,469,207 | B2 * | 10/2016 | Keeling | ................... B60L 5/005 |
| 9,472,338 | B2 * | 10/2016 | Keeling | ................... H04B 5/79 |
| 2013/0038281 | A1 | 2/2013 | Sakakibara et al. | |
| 2017/0163096 | A1 | 6/2017 | Akahori | |
| 2017/0222490 | A1 * | 8/2017 | Boys | ...................... H02J 50/12 |
| 2019/0157909 | A1 | 5/2019 | Akahori | |
| 2020/0021147 | A1 | 1/2020 | Shijo | |
| 2021/0143684 | A1 | 5/2021 | Sumiya et al. | |

FOREIGN PATENT DOCUMENTS

JP           6460373   B2     1/2019

* cited by examiner

*Primary Examiner* — Carlos Amaya
(74) *Attorney, Agent, or Firm* — Oliff PLC

(57) ABSTRACT

A coil unit for a contactless power supply system includes a plurality of coils for electric power transfer, and a magnetic flux reduction structure. The plurality of coils include a first coil and a second coil adjacent to the first coil in a predetermined direction. The magnetic flux reduction structure reduces, during electric power transfer using the first coil, magnetic flux by which the first coil causes an induced voltage or induced current to be generated in the second coil.

4 Claims, 21 Drawing Sheets

CONTACTLESS POWER SUPPLY SYSTEM AND COIL UNIT THEREOF

CROSS-REFERENCE TO RELATED APPLICATIONS

The present application is a continuation application of International Application No. PCT/JP2021/020396 filed on May 28, 2021, which is based on and claims priority from Japanese Patent Application No. 2020-100608 filed on Jun. 10, 2020. The entire contents of these applications are incorporated by reference into the present application.

BACKGROUND

1 Technical Field

The present disclosure relates to contactless power supply systems and coil units thereof.

2 Description of Related Art

There is disclosed, for example in Japanese Patent Application Publication No. JP2011234496A, a contactless power supply system that is installed outdoors to supply electric power to a parked vehicle in a contactless manner. In the contactless power supply system, a resonance coil (i.e., power supply coil or power transmission coil) is constituted of a plurality of coils connected in series with each other. Moreover, the coils are arranged adjacent to one another on a plane parallel to a surface through which electric power transmission and electric power reception are performed. Furthermore, for each adjacent pair of the coils, the directions of electromagnetic fields generated respectively by the coils of the pair are opposite to each other with respect to the plane.

SUMMARY

The contactless power supply system in the above patent document is configured to supply electric power to the coils that are arranged at a parking position, so as to supply electric power to a parked vehicle. In contrast, in a contactless power supply system configured to supply electric power to a traveling vehicle, a number of coils are arranged along a road; and electric power is supplied, to only one of the coils which is located at a position corresponding to the position of the vehicle. However, when the coil which is located at a position corresponding to the position of the vehicle is electromagnetically coupled to another one of the coils, induced current will flow in the another one of the coils, resulting in loss of the supplied electric power.

The present disclosure has been accomplished in view of the above problem.

According to one aspect of the present disclosure, there is provided a coil unit for a contactless power supply system. The coil unit includes a plurality of coils for electric power transfer, and a magnetic flux reduction structure. The plurality of coils include a first coil and a second coil adjacent to the first coil in a predetermined direction. The magnetic flux reduction structure reduces, during electric power transfer using the first coil, magnetic flux by which the first coil causes an induced voltage or induced current to be generated in the second coil.

With the above configuration, it is possible to reduce the magnetic flux that passes through the second coil as well as the first coil. Consequently, it becomes possible to suppress the electric power supplied to the first coil from leaking to the second coil. That is, it becomes possible to suppress loss of the supplied electric power. Moreover, it becomes difficult for the second coil to be electromagnetically coupled to the first coil; thus, it becomes possible to suppress the second coil from affecting the impedance of the first coil.

DESCRIPTION OF EMBODIMENTS (Overall Configuration of Contactless Power Supply System for Traveling Vehicle)

Figure 1:
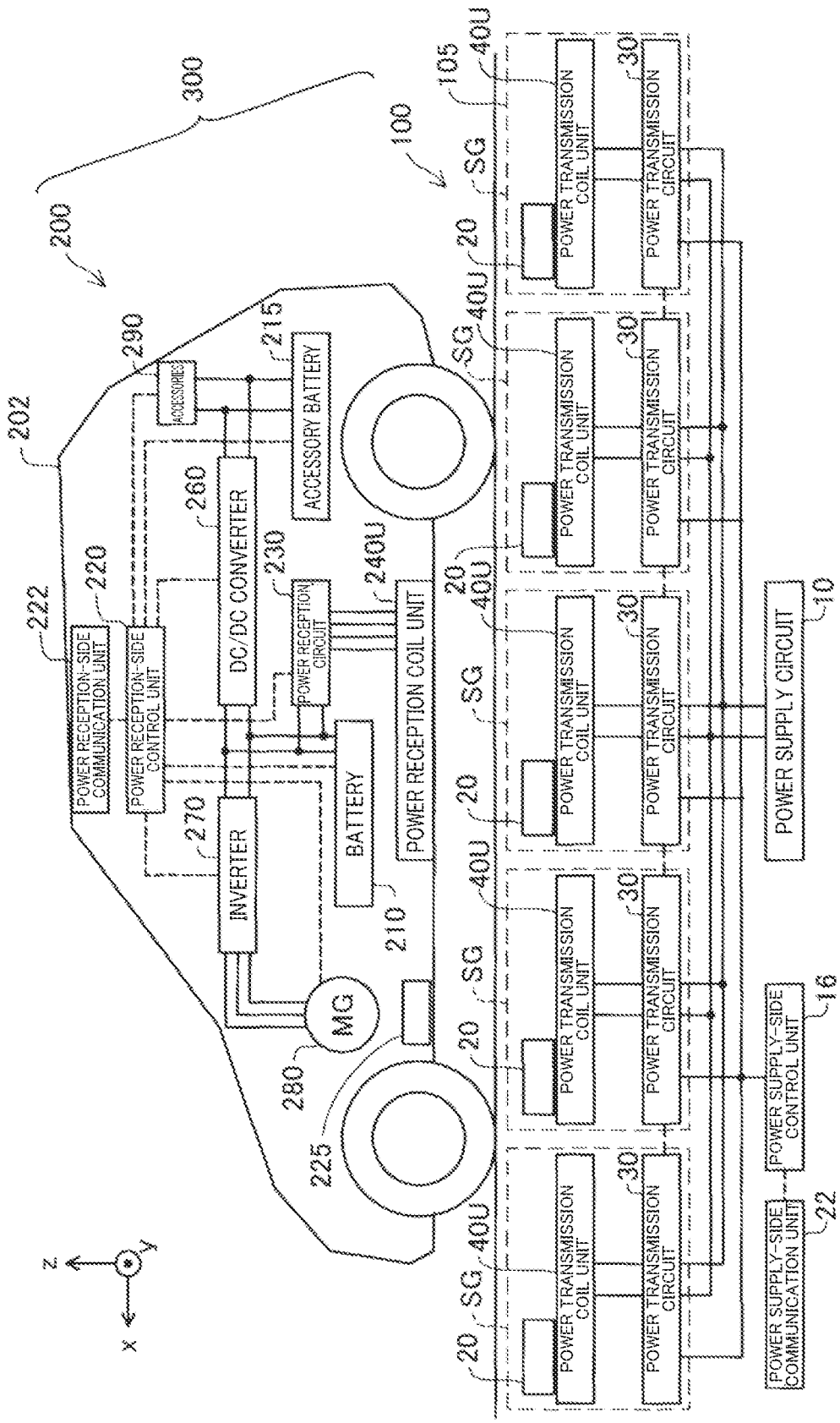
FIG. 1 is an explanatory diagram illustrating a contactless power supply system for a traveling vehicle.

As shown in FIG. 1, a contactless power supply system 300 for a traveling vehicle includes a power supply apparatus 100 and a power reception apparatus 200. The power supply apparatus 100 is provided in a road 105 that is an area where a vehicle 202, which is a moving object, can move. The power reception apparatus 200 is provided in the vehicle 202. The contactless power supply system 300 is a system capable of supplying electric power from the power supply apparatus 100 to the power reception apparatus 200 in a contactless manner during traveling of the vehicle 202. The vehicle 202 may be configured as, for example, an electric vehicle or a hybrid vehicle. It should be noted that in FIG. 1: the +x direction represents the traveling direction of the vehicle 202; the +y direction represents the right direction as viewed from the front side of the vehicle 202; and the +z direction represents the vertically upward direction.

The power supply apparatus 100 on the road 105 side includes: a plurality of coil units 40U for transmitting electric power (hereinafter, to be also referred to as "power transmission coil units 40U"); a plurality of power transmission circuits 30 for supplying an AC voltage respectively to the power transmission coil units 40U; a plurality of vehicle position detection units 20 provided correspondingly to the power transmission circuits 30 or to the power transmission coil units 40U; a power supply circuit 10 for supplying a DC voltage to all the power transmission circuits 30; a power supply-side control unit 16; and a power supply-side communication unit 22.

The power transmission coil units 40U are installed along the x direction at a predetermined depth from the ground surface of the road 105. Each of the power transmission coil units 40U includes a plurality of coils; the configuration of the coils will be described in detail later. Each of the power transmission circuits 30 is a circuit that converts the DC voltage supplied from the power supply circuit 10 into a high-frequency AC voltage and applies the high-frequency AC voltage to a corresponding one of the power transmission coil units 40U. Specifically, each of the power transmission circuits 30 includes an inverter circuit and a resonant circuit. It should be noted that each of the power transmission circuits 30 may further include a filter circuit in addition to the inverter circuit and the resonant circuit. Each pair of the power transmission coil units 40U and the power transmission circuits 30 will be collectively referred to as a "power supply segment SG". In addition, depending on the situation, the power supply segment SG may be simply referred to as the "segment SG". It should be noted that each power supply segment SG may alternatively include a plurality of power transmission coil units and a power transmission circuit. The power supply circuit 10 is a circuit that supplies the DC voltage to the power transmission circuits 30. Specifically, the power supply circuit 10 may be configured as, for example, an AC-to-DC converter circuit that rectifies an AC voltage supplied from a commercial power supply into a DC voltage and outputs the DC voltage to the power transmission circuits 30. In addition, the DC voltage outputted from the power supply circuit 10 may not be a perfect DC voltage; that is, the DC voltage may include fluctuation (or ripple) to a certain extent.

Each of the vehicle position detection units 20 is configured to detect the position of the vehicle 202. Specifically, when the vehicle 202 moves and has a power reception coil unit 240U of the vehicle 202 located vertically above one of the power transmission coil units 40U, the coils of the power transmission coil unit 40U are electromagnetically coupled to coils of the power reception coil unit 240U, causing the impedance of the coils of the power transmission coil unit 40U to change. Each of the vehicle position detection units 20 detects the position of the vehicle 202 by measuring the impedance of the coils of a corresponding one of the power transmission coil units 40U. The calculation of the impedance will be described in the explanation of FIG. 2 later. Alternatively, each of the vehicle position detection units 20 may communicate with, for example, a vehicle-side position sensor 225 provided in the vehicle 202 and detect, based on the communication strength, whether the vehicle 202 is located above the corresponding segment SG. According to the position of the vehicle 202 detected by the vehicle position detection units 20, the power transmission circuits 30 perform electric power transmission using one or more power transmission coil units 40U located close to the vehicle 202. The power supply-side control unit 16 controls the supply of electric power from the segments SG to the vehicle 202. In addition, each of the vehicle position detection units 20 may detect the position of the vehicle 202 by other methods, such as using a camera, a search coil or a laser.

The power supply-side communication unit 22 communicates with a power reception-side communication unit 222 provided in the vehicle 202. The communication between the power supply-side communication unit 22 and the power reception-side communication unit 222 may include, for example, a power supply instruction and a main power supply instruction.

The vehicle 202 includes a battery 210, an accessory battery 215, a power reception-side control unit 220, the aforementioned power reception-side communication unit 222, the aforementioned vehicle-side position sensor 25, a power reception circuit 230, the aforementioned power reception coil unit 240U, a DC-to-DC converter circuit 260, an inverter circuit 270, a motor-generator 280 and accessories 290. The power reception coil unit 240U is connected with the power reception circuit 230. Moreover, to an output side of the power reception circuit 230, there are connected the battery 210, a high-voltage side of the DC-to-DC converter circuit 260 and the inverter circuit 270. Further, to a low-voltage side of the DC-to-DC converter circuit 260, there are connected the accessory battery 215 and the accessories 290. Furthermore, to the inverter circuit 270, there is connected the motor-generator 280.

The power reception coil unit 240U is a device that couples with any of the power transmission coil units 40U to generate induced current by electromagnetic induction. The power reception circuit 230 includes a rectification circuit that converts an AC voltage outputted from the power reception coil unit 240U into a DC voltage, and a DC-to-DC converter circuit that coverts the DC voltage generated by the rectification circuit into a DC voltage suitable for charging the battery 210. The DC voltage outputted from the power reception circuit 230 can be used for charging the battery 210 and for driving the motor-generator 280 via the inverter circuit 270. Moreover, the DC voltage outputted from the power reception circuit 230 can also be used, through a voltage step-down by the DC-to-DC converter circuit 260, for charging the accessory battery 215 and for driving the accessories 290. It should be noted that the vehicle 202 may alternatively be configured to have a plurality of power reception coil units 240U installed therein. With the plurality of power reception coil units 240U, it will become possible to realize a robust optimal design against positional deviation of the vehicle 202. Moreover, in this case, one power reception circuit 230 may be provided for each of the power reception coil units 240U.

The battery 210 is a secondary battery that outputs, for driving the motor-generator 280, a higher DC voltage than the accessory battery 215. The battery 210 is configured, by serially connecting a number of low-voltage battery cells, to be capable of outputting a high voltage, for example a voltage higher than 200V. The motor-generator 280 operates as a three-phase AC motor to generate a driving force for driving the vehicle 202 to travel. Otherwise, during deceleration of the vehicle 202, the motor-generator 280 operates as an electric generator to regenerate electric power. When the motor-generator 280 operates as a three-phase AC motor, the inverter circuit 270 converts DC power outputted from the battery 210 into three-phase AC power and supplies the three-phase AC power to the motor-generator 280. Otherwise, when the motor-generator 280 operates as an electric generator, the inverter circuit 270 converts three-phase AC power regenerated by the motor-generator 280 into DC power and supplies the DC power to the battery 210.

The DC-to-DC converter circuit 260 converts the output voltage of the battery 210 into a lower voltage and supplies the lower voltage to the accessory battery 215 and the accessories 290. The accessory battery 215 is a secondary battery for driving the accessories 290. The output voltage of the accessory battery 215 is lower than that of the battery 210. For example, the output voltage of the accessory battery 215 may be 12V, 24V or 48V. The accessories 290 include peripheral devices, such as an air conditioner, an electric power steering device, a headlight, a direction indicator and a wiper of the vehicle 202, and various accessories of the vehicle 202.

The power reception-side control unit 220 controls the inverter 270 and other components in the vehicle 202. When the vehicle 202 receives contactless power supply during traveling thereof, the power reception-side control unit 220 controls the power reception circuit 230 to receive electric power.

Figure 2:
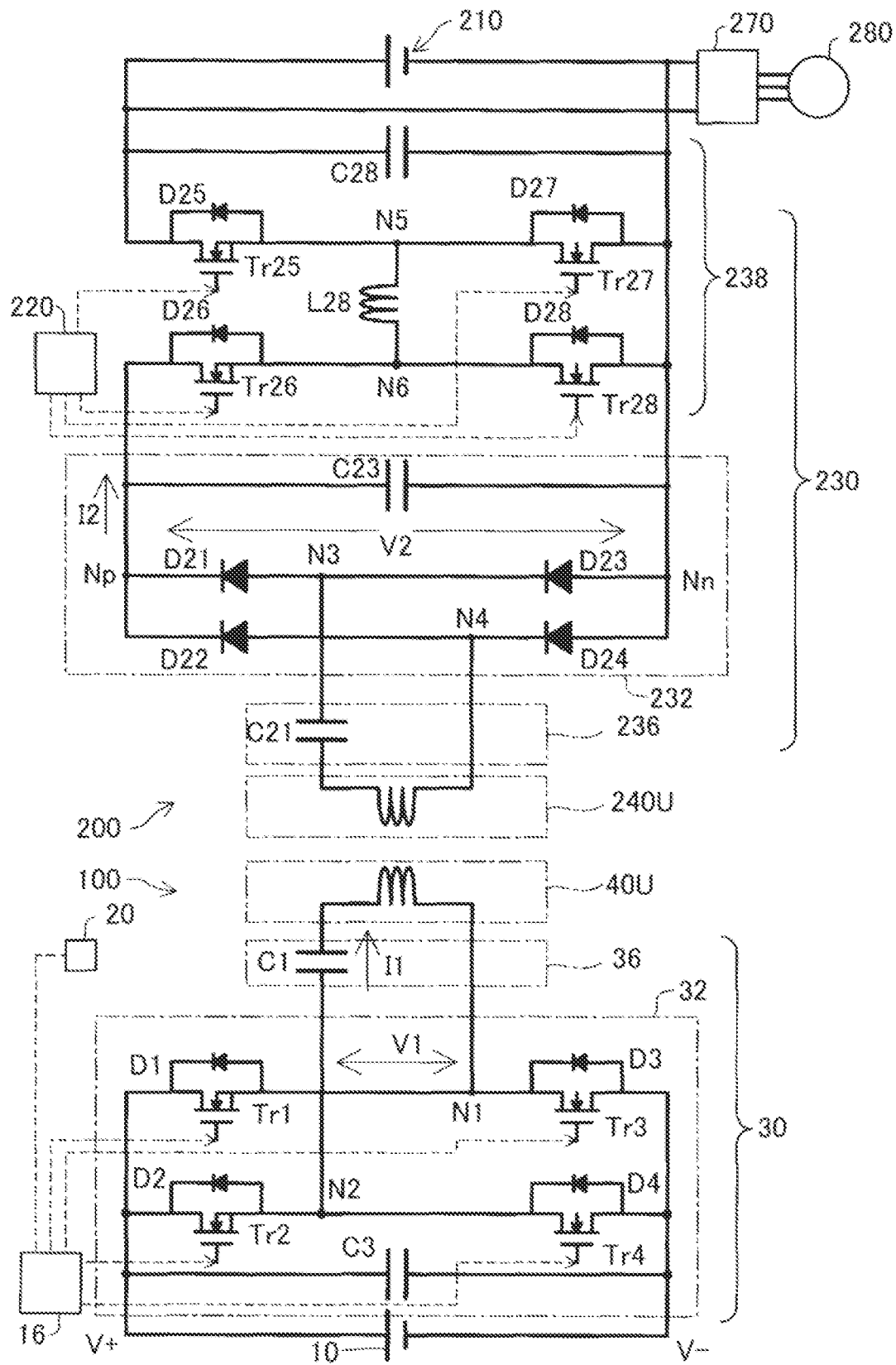
FIG. 2 is an explanatory diagram illustrating the overall configuration of a power transmission section of the contactless power supply system.

As shown in FIG. 2, the power supply apparatus 100 includes the power transmission circuits 30 and the power transmission coil units 40U. Each of the power transmission circuits 30 includes an inverter circuit 32 and a resonant circuit 36. The inverter circuit 32 is a circuit that converts DC power into AC power. The inverter circuit 32 includes four switching transistors Tr1 to Tr4, a capacitor C3, and four protection diodes D1 to D4. The four switching transistors Tr1 to Tr4 together form an H bridge circuit. Specifically, the switching transistors Tr1 and Tr3 are connected in series with each other; and the switching transistors Tr2 and Tr4 are connected in series with each other. Moreover, both the switching transistors Tr1 and Tr2 are connected to a positive power supply line V+, and both the switching transistors Tr3 and Tr4 are connected to a negative power supply line V−. Both an intermediate node N1 between the switching transistors Tr1 and Tr3 and an intermediate node N2 between the switching transistors Tr2 and Tr4 are connected to the corresponding power transmission coil unit 40U via the resonant circuit 36. The protection diodes D1 to D4 are connected respectively in parallel with the switching transistors Tr1 to Tr4. The capacitor C3 is a smoothing capacitor that is provided between the positive power supply line V+ and the negative power supply line V−. The power supply-side control unit 16 cyclically switches the state of the inverter circuit 32 between a first state and a second state, thereby converting DC power into AC power using the inverter circuit 32. In the first state, both the switching transistors Tr1 and Tr4 are turned on, whereas both the switching transistors Tr2 and Tr3 are turned off. In contrast, in the second state, both the switching transistors Tr2 and Tr3 are turned on, whereas both the switching transistors Tr1 and Tr4 are turned off.

The resonant circuit 36 is formed of a capacitor C1 that is serially inserted between the corresponding power transmission coil unit 40U and the inverter circuit 32. Accordingly, in the present embodiment, the resonant circuit 36 is formed as a series resonant circuit. It should be noted that the resonant circuit 36 may alternatively be formed as a parallel resonant circuit by connecting the capacitor C1 in parallel with the corresponding power transmission coil unit 40U. In addition, a filter circuit may be provided between the inverter circuit 32 and the resonant circuit 36.

The vehicle-side power reception apparatus 200 includes the power reception circuit 230 and the power reception coil unit 240U. The power reception circuit 230 includes a resonant circuit 236, a rectification circuit 232 and a DC-to-DC converter circuit 238. The resonant circuit 236 is formed of a capacitor C21 that is connected in series with the power reception coil unit 240U. Accordingly, in the present embodiment, the resonant circuit 236 is formed as a series resonant circuit. It should be noted that the resonant circuit 236 may alternatively be formed as a parallel resonant circuit by connecting the capacitor C21 in parallel with the power reception coil unit 240U. In addition, a filter circuit may be provided between the resonant circuit 236 and the rectification circuit 232.

The rectification circuit 232 is a bridge rectification circuit that includes four rectification diodes D21 to D24 and a smoothing capacitor C23. Specifically, the rectification diodes D21 and D23 are connected in series with each other; and the capacitor C21 of the resonant circuit 236 is connected to an intermediate node N3 between the rectification diodes D21 and D23. Moreover, the rectification diodes D22 and D24 are connected in series with each other; and the power reception coil unit 240U is connected to an intermediate node N4 between the rectification diodes D22 and D24. Furthermore, both the cathode of the rectification diode D21 and the cathode of the rectification diode D22 are connected to a node Np; and both the anode of the rectification diode D23 and the anode of the rectification diode D24 are connected to a node Nn. In addition, the smoothing capacitor C23 is connected between the node Np and the node Nn.

The DC-to-DC converter circuit 238 is a circuit that steps up or steps down the DC voltage outputted from the rectification circuit 232 and supplies the stepped-up or stepped-down DC voltage to the battery 210. The DC-to-DC converter circuit 238 includes four switching transistors Tr25 to Tr28, an inductor L28, four protection diodes D25 to D28 and a smoothing capacitor C28. The switching transistors Tr25 and Tr27 are connected in series with each other between the node Np and the node Nn; and the switching transistors Tr26 and Tr28 are also connected in series with each other between the node Np and the node Nn. The inductor L28 is connected between an intermediate node N5 between the switching transistors Tr25 and Tr27 and an intermediate node N6 between the switching transistors Tr26 and Tr28. The protection diodes D25 to D28 are connected respectively in parallel with the switching transistors Tr25 to Tr28. The smoothing capacitor C28 is provided on the battery 210 side of the four switching transistors Tr25 to Tr28. The power reception-side control unit 220 controls the voltage conversion in the DC-to-DC converter circuit 238 by controlling the on/off operation of the four switching transistors Tr25 to Tr28 of the DC-to-DC converter circuit 238.

The motor-generator 280 is connected with the battery 210 via the inverter circuit 270.

Let L1 be the inductance of the coils of the power transmission coil unit 40U, R1 be the total electrical resistance of the coils and the wiring, C1 be the capacitance of the capacitor C1 of the resonant circuit 36 and L2 be the inductance of the coils of the power reception coil unit 240U, then the impedance Z of the coils of the power transmission coil unit 40U can be calculated by the following equations:

$$Z = R1 + R + j(\omega 1 \cdot Lc - 1/(\omega 1 \cdot C1)); \text{ and}$$

$$Lc = L1 + L2 \pm 2Mc = L1 + L2 \pm 2kc(L1 \cdot L2)^{1/2}$$

where kc is a coupling coefficient determined by the relative position between the coils of the power transmission coil unit 40U and the coils of the power reception coil unit 240U. That is, the value of the impedance Z changes depending on the relative position between the coils of the power transmission coil unit 40U and the coils of the power reception coil unit 240U. Therefore, based on the impedance Z, the vehicle position detection unit 20 can determine the relative position between the power transmission coil unit 40U and the power reception coil unit 240U, i.e., can determine the position of the vehicle 202.

As described above, each of the power transmission coil units 40U includes a plurality of coils. Hereinafter, the configuration of the coils in each of the power transmission coil units 40U will be described.

First Embodiment

Figure 3A:
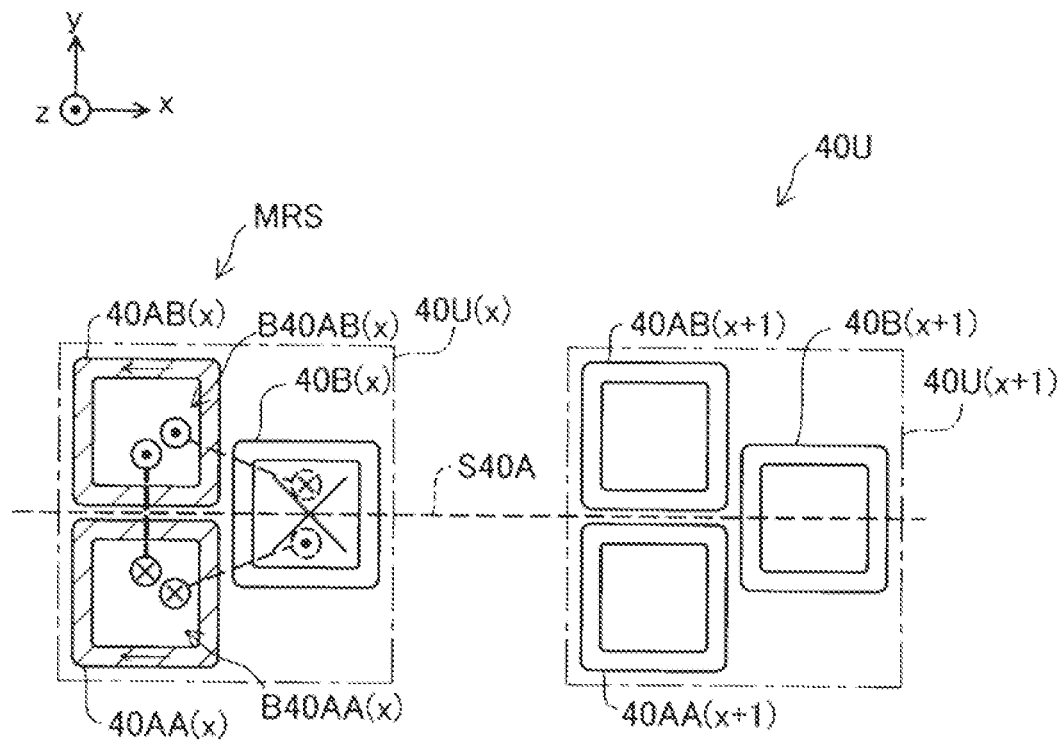
FIG. 3A is an explanatory diagram illustrating a power transmission coil unit according to a first embodiment.
Figure 3B:
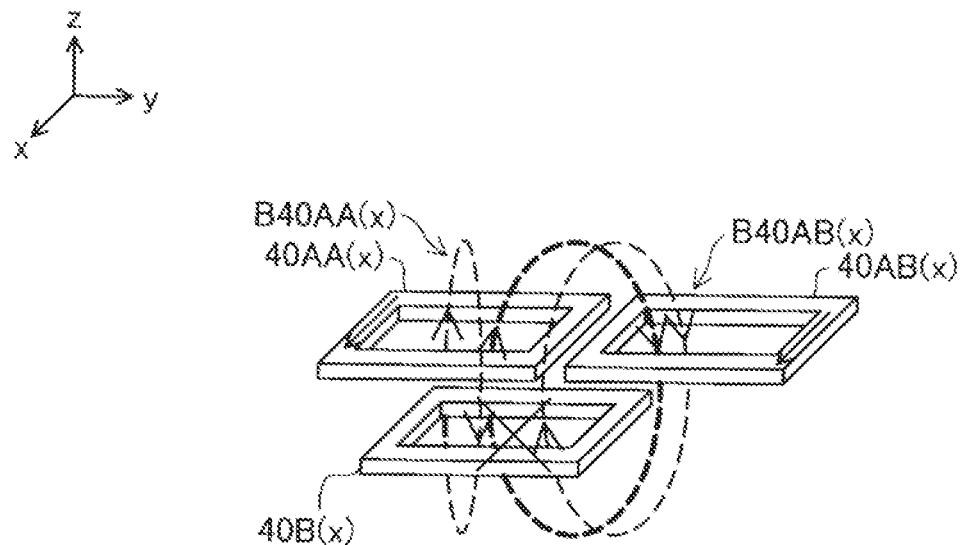
FIG. 3B is another explanatory diagram illustrating the power transmission coil unit according to the first embodiment.

As shown in FIGS. 3A and 3B, in the first embodiment, each of the power transmission coil units 40U(x) includes a coil 40AA(x), a coil 40AB(x) and a coil 40B(x). Here, x in (x) is a number indicating a position in the x direction along the traveling direction of the vehicle 202. It should be noted that (x) may be omitted when it is unnecessary to distinguish the positions. The power transmission coil units 40U(x) are arranged at predetermined intervals along the x direction that represents the traveling direction of the vehicle 202. In each of the power transmission coil units 40U(x), the coils 40AA(x) and 40AB(x) have the same shape as viewed along the z direction; and the number of turns of the coil 40AA(x) is equal to the number of turns of the coil 40AB(x). Moreover, the coils 40AA(x) and 40AB(x) are arranged side by side in the y direction on an x-y plane; and they are symmetrical with respect to a symmetry plane S40A that is a z-x plane. In addition, the term "symmetrical" used hereinafter denotes that the overall shapes and arrangement positions of the coils are symmetrical. The coil 40B(x) is arranged on the x-y plane and on the +x side of the coils 40AA(x) and 40AB(x). Moreover, the coil 40B(x) is symmetrical with respect to the symmetry plane S40A. It should be noted that the coil 40B(x) may alternatively be arranged on the opposite side, i.e., on the −x side of the coils 40AA(x) and 40AB(x). In addition, in FIGS. 3A and 3B, B40AA(x) and B40AB(x) respectively designate magnetic fluxes generated by the coils 40AA(x) and 40AB(x) when electric currents flow through them. The same applies to the other figures hereinafter.

Figure 4:
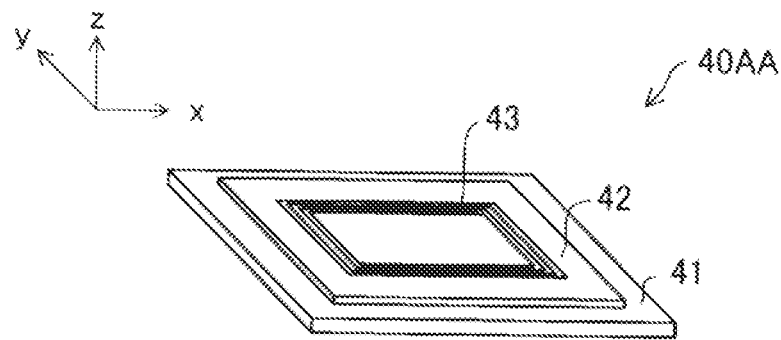
FIG. 4 is an explanatory diagram illustrating the configuration of a coil of the power transmission coil unit according to the first embodiment.

As shown in FIG. 4, the coil 40AA includes a base plate 41, a core 42 and a winding 43. The base plate 41 is formed of a paramagnetic material such as aluminum. The core 42 is arranged on the base plate 41. The core 42 is formed of a ferromagnetic material such as ferrite. The winding 43 is wound on a surface of the core 42 on the opposite side to the base plate 41. In addition, both the coil 40AB and the coil 40B have the same configuration as the coil 40AA.

The power transmission circuit 30 applies an AC voltage to the coil unit 40U(x) so that electric currents flow through the coils 40AA(x) and 40AB(x) respectively in opposite directions as viewed along the z direction. For example, as shown in FIG. 3A, the power transmission circuit 30 causes electric current to flow clock wise through the coil 40AA(x) as viewed from the +z side, while causing electric current to flow counterclockwise through the coil 40AB(x) as viewed from the +z side. In this case, the magnetic flux B40AA(x) is generated inside the coil 40AA(x) to flow from the +z side to the −z side. Moreover, part of the magnetic flux B40AA(x) tends to pass through the inside of the coil 40B(x) from the −z side to the +z side on the −y side of the symmetry plane S40A. On the other hand, the magnetic flux B40AB(x) is generated inside the coil 40AB(x) to flow from the −z side to the +z side. Moreover, part of the magnetic flux B40AB(x) tends to pass through the inside of the coil 40B(x) from the +z, side to the −z side on the +y side of the symmetry plane S40A. That is, both part of the magnetic flux B40AA(x) toward the +z side and part of the magnetic flux B40AB(x) toward the −z side tend to pass through the inside of the coil 40B(x). However, on the inside of the coil 40B(x), the direction of the magnetic flux B40AA(x) and the direction of the magnetic flux B40AB(x) would be opposite to each other; therefore, it is difficult for either of the magnetic fluxes to pass through the inside of the coil 40B(x).

As shown in FIG. 3B, when the power transmission circuit 30 causes electric current to flow counterclockwise through the coil 40AA(x) as viewed from the +z side and electric current to flow clockwise through the coil 40AB(x) as viewed from the +z side, the directions of the magnetic fluxes are opposite to those shown in FIG. 3A. In this case, it is also difficult for either of the magnetic fluxes to pass through the inside of the coil 40B(x).

The direction in which the magnetic flux B40AA(x) tends to pass through the coil 40B(x) is opposite to the direction in which the magnetic flux B40AB(x) tends to pass through the coil 40B(x). Consequently, magnetic flux passing through the inside of the coil 40B(x) becomes substantially zero due to repulsion or cancellation between the magnetic flux B40AA(x) and the magnetic flux B40AB(x) that are in opposite directions to each other. Furthermore, in the present embodiment, the power transmission circuit 30 applies the AC voltage to the coil unit 40U(x) so that electric current flowing through the coil 40AA(x) and electric current flowing through the coil 40AB(x) are in sync with each other; therefore, the magnitudes of the magnetic fluxes B40AA(x)

and B40AB(x) change in the same manner. Consequently, magnetic flux passing through the coil 40B(x) hardly changes.

When the magnitude of magnetic flux passing through the coil 40B(x) changes, an induced voltage or induced current is generated in the coil 40B(x). Hereinafter, "induced voltage or induced current" will be simply referred to as "induced current". The direction of the induced current is a direction such that the magnetic flux generated by the induced current opposes the change in the magnetic flux passing through the coil 40B(x). That is, the magnetic flux generated by the induced current of the coil 40B(x) increases with decrease in the magnetic flux passing through the coil 40B(x), and decreases with increase in the magnetic flux passing through the coil 40B(x). As described above, in the present embodiment, magnetic flux passing through the coil 40B(x) is substantially zero; and even with the application of the AC voltage by the power transmission circuit 30 to the coils 40AA(x) and 40AB(x), the magnetic flux passing through the coil 40B(x) is unchanged remaining substantially zero. Consequently, substantially no induced current is generated in the coil 40B(x).

As described above; in the present embodiment, during the electric power transfer using the coils 40AA(x) and 40AB(x), the coils 40AA(x) and 40AB(x) together function as a magnetic flux reduction structure (MRS) to reduce magnetic flux that would cause induced current to be generated in the coil 40B(x). As a result; induced current is hardly generated in the coil 40B(x). That is, it is difficult for the electric power supplied to the coils 40AA(x) and 40AB (x) to leak to the coil 40B(x). Consequently, it becomes possible to suppress loss of the supplied electric power. Moreover, it is difficult for the coils 40AA(x) and 40AB(x) to be electromagnetically coupled to the coil 40B(x); therefore, it is difficult for the coil 40B(x) to affect the impedances of the coils 40AA(x) and 40AB(x).

Second Embodiment

Figure 5A:
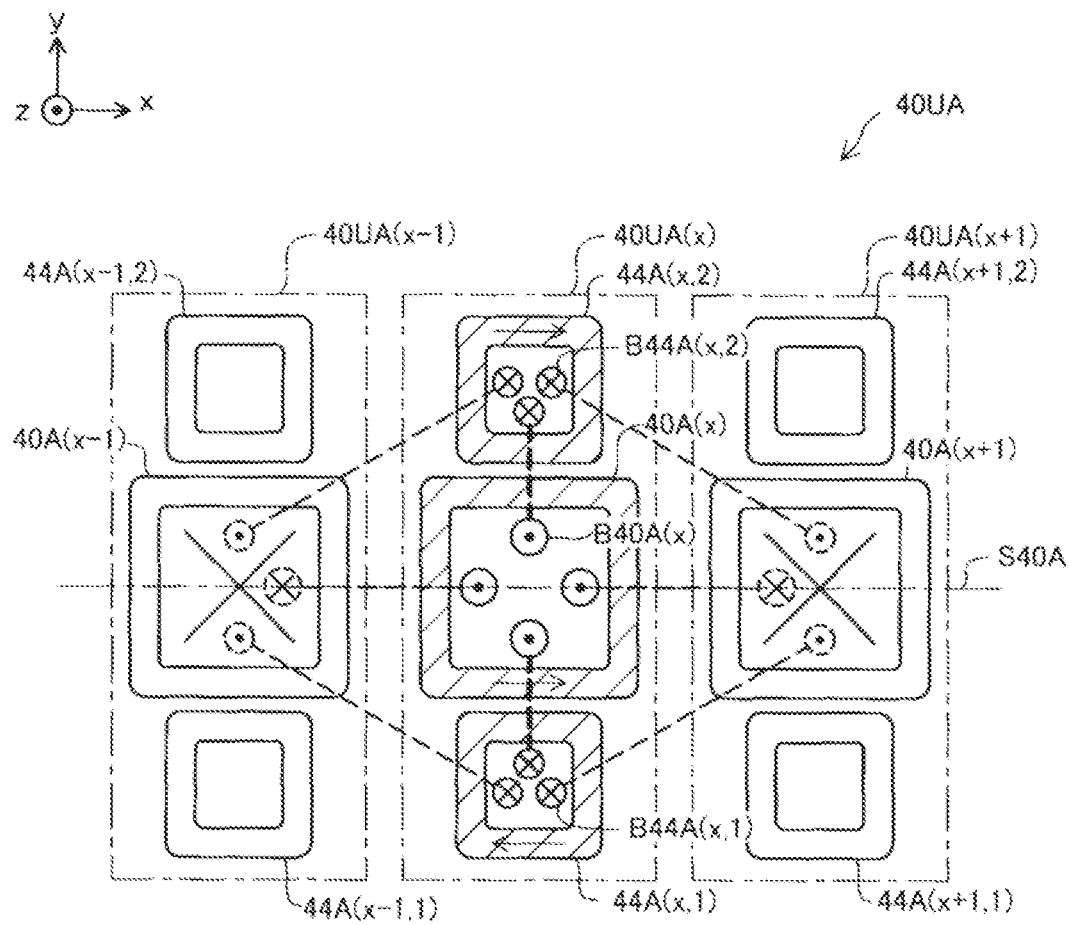
FIG. 5A is an explanatory diagram illustrating a power transmission coil unit according to a second embodiment.
Figure 5B:
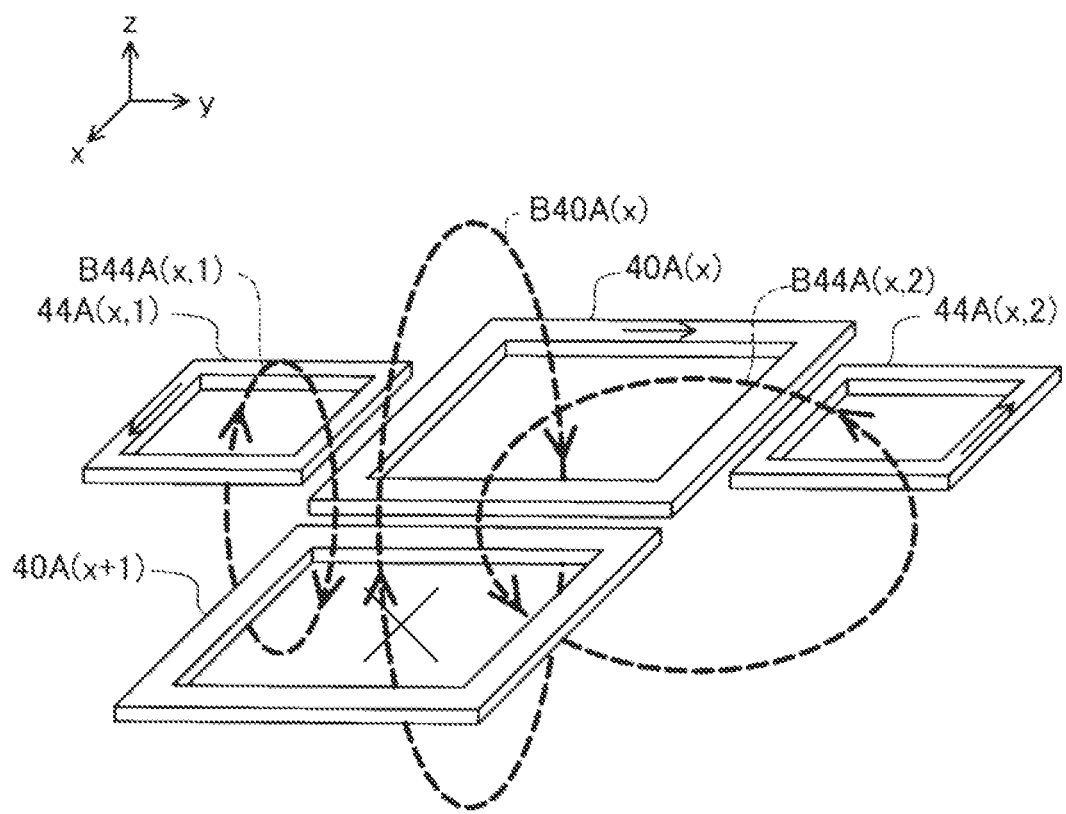
FIG. 5B is another explanatory diagram illustrating the power transmission coil unit according to the second embodiment.

As shown in FIGS. 5A and 5B, in the second embodiment, the power supply apparatus 100 includes a plurality of power transmission coil units 40UA(x) arranged in the x direction. Here, x in (x) is a number indicating a position in the x direction, as in the first embodiment. Three power transmission coil units 40UA(x−1), 40UA(x) and 40UA(x+1) shown in FIG. 5A are arranged in this order from the −x side to the +x side. The three power transmission coil units 40UA(x−1), 40UA(x) and 40UA(x+1) have the same configuration; therefore, the configuration thereof will be described hereinafter taking the power transmission coil unit 40UA(x) as an example.

The power transmission coil unit 40UA(x) includes a coil 40A(x), a coil 44A(x, 1) and a coil 44A(x, 2), all of which are arranged on an x-y plane. Specifically, the three coils are arranged in the order of the coil 44A(x, 1), the coil 40A(x) and the coil 44A(x, 2) from the −y side to the +y side as viewed from the +z side. The coils 44A(x, 1) and 44A(x, 2) have the same shape as viewed from the +z side; and the number of turns of the coil 44A(x, 1) is equal to the number of turns of the coil 44A(x, 2). Moreover, the coils 44A(x, 1) and 44A(x, 2) are symmetrical with respect to a symmetry plane S40A that is a z-x plane.

The power transmission circuit 30 applies an AC voltage to the power transmission coil unit 40UA(x) so that the direction of electric current flowing through the coil 40A(x) is opposite to the directions of electric currents flowing respectively through the coils 44A(x, 1) and 44A(x, 2). For example, as shown in FIG. 5A, the power transmission circuit 30 causes electric current to flow counterclockwise through the coil 40A(x) as viewed from the +z side, while causing electric currents to flow clockwise respectively through the coils 44A(x, 1) and 44A(x, 2) as viewed from the +z side. In this case, magnetic flux B40A(x) is generated inside the coil 40A(x) to flow from the −z side to the +z side. Moreover, parts of the magnetic flux B40A(x) tend to pass, from the +z side to the −z side, respectively through the coils 44A(x, 1), 44A(x, 2), 40A(x−1) and 40A(x+1) all of which are adjacent to the coil 40A(x). On the other hand, magnetic flux B44A(x, 1) is generated inside the coil 44A(x, 1) to flow from the +z side to the −z side. Moreover, parts of the magnetic flux B44A(x, 1) tend to pass, from the −z side to the +z side, respectively through the inside of the coil 40A(x), the inside of the coil tis 40A(x−1) on the −y side of the symmetry plane S40A and the inside of the coil 40A(x+1) on the −y side of the symmetry plane S40A. Similarly, magnetic flux B44A(x, 2) is generated inside the coil 44A(x, 2) to flow from the +z side to the −z side. Moreover, parts of the magnetic flux B44A(x, 2) tend to pass, from the −z side to the +z side, respectively through the inside of the coil 40A(x), the inside of the coil 40A(x−1) on the +y side of the symmetry plane S40A and the inside of the coil 40A(x+1) on the +y side of the symmetry plane S40A.

As shown in FIG. 5B, when the power transmission circuit 30 causes electric current to flow clockwise through the coil 40A(x) as viewed from the +z side and electric currents to flow counterclockwise respectively through the coils 44A(x, 1) and 44A(x, 2) as viewed from the +z side, the directions of the magnetic fluxes are opposite to those shown in FIG. 5A.

The direction in which the magnetic flux B40A(x) tends to pass through the coil 40A(x−1) is opposite to the directions in which the magnetic fluxes B44A(x, 1) and B44A(x, 2) tend to pass through the coil 40A(x−1). Consequently, magnetic flux passing through the inside of the coil 40A(x−1) becomes substantially zero due to repulsion or cancellation between the magnetic flux B40A(x) and the magnetic fluxes B44A(x, 1) and B44A(x, 2) whose directions are opposite to the direction of the magnetic flux B40A(x). Hence, as in the first embodiment, substantially no induced current is generated in the coil 40A(x−1). The same applies to the coil 40A(x+1). Moreover, the same also applies to the cases where the power transmission circuit 30 applies the AC voltage to the other power transmission coil units 40UA(x−1) and 40UA(x+1).

As described above, in the second embodiment, during the electric power transfer using the coil 40A(x), the coils 44A(x, 1) and 44A(x, 2) together function as a magnetic flux reduction structure to reduce magnetic flux that would cause induced current to be generated in the coils 40A(x−1) and 40A(x+1) adjacent to the coil 40A(x). As a result, induced current is hardly generated in the coils 40A(x−1) and 40A (x+1). That is, it is difficult for the electric power supplied to the coil 40A(x) to leak to the coils 40A(x−1) and 40A(x+1). Consequently, it becomes possible to suppress loss of the supplied electric power. Moreover, it is difficult for the coil 40A(x) to be electromagnetically coupled to the coils 40A(x−1) and 40A(x+1); therefore, it is difficult for the coils 40A(x−1) and 40A(x+1) to affect the impedance of the coil 40A(x).

Third Embodiment

Figure 6:
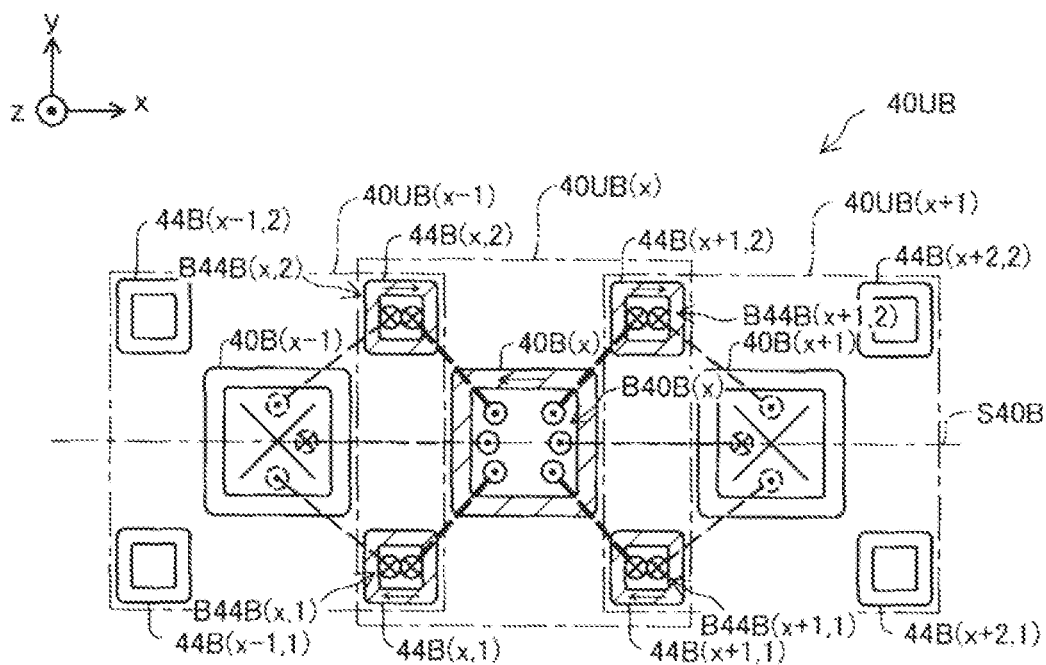
FIG. 6 is an explanatory diagram illustrating a power transmission coil unit according to a third embodiment.

As shown in FIG. 6, in the third embodiment, the power supply apparatus 100 includes a plurality of power transmission coil units 40UB(x) arranged along the x direction. Each power transmission coil unit 40UB(x) includes a coil 40B(x), and coils 44B(x, 1), 44B(x, 2), 44B(x+1, 1) and 44B(x+1, 2). Here, x is a number indicating the position of the power transmission coil unit 40UB(x). The four coils 44B(x, 1), 44B(x, 2), 44B(x+1, 1) and 44B(x+1, 2) are arranged, on an x-y plane where the coil 40B(x) is arranged, to surround the coil 40B(x). Specifically, the coil 44B(x, 1) is arranged on the −x−y side of the coil 40B(x); the coil 44B(x, 2) is arranged on the −x+y side of the coil 40B(x) the coil 44B(x+1, 1) is arranged on the +x−y side of the coil 40B(x); and the coil 44B(x+1, 2) is arranged on the +x+y side of the coil 40B(x).

The coils 44B(x, 1) and 44B(x, 2) are mutually symmetrical with respect to a symmetry plane S40B that is a z-x plane. On the other hand, the coils 44B(x+1, 1) and 44B(x+1, 2) are mutually symmetrical with respect to the symmetry plane S40B.

The coils 44B(x, 1) and 44B(x, 2) also constitute coils of the power transmission coil unit 40UB(x−1) for surrounding a coil 40B(x−1) of the power transmission coil unit 40UB(x−1). That is, the coils 44B(x, 1) and 44B(x, 2) are coils shared by both the power transmission coil unit 40UB(x) and the power transmission coil unit 40UB(x−1). Similarly, the coils 44B(x+1, 1) and 44B(x+1, 2) are coils shared by both the power transmission coil unit 40UB(x) and the power transmission coil unit 40UB(x+1).

The power transmission circuit 30 applies an AC voltage to the power transmission coil unit 40UB(x) so that the direction of electric current flowing through the coil 40B(x) is opposite to the directions of electric currents flowing respectively through the four coils 44B(x, 1), 44B(x, 2), 44B(x+1, 1) and 44B(x+1, 2). For example, as shown in FIG. 6, the power transmission circuit 30 causes electric current to flow counterclockwise through the coil 40B(x) as viewed from the +z side, while causing electric currents to flow clockwise respectively through the four coils 44B(x, 1), 44B(x, 2), 44B(x+1, 1) and 44B(x+1, 2) surrounding the coil 40B(x) as viewed from the +z side. In this case, magnetic flux B40B(x) is generated inside the coil 40B(x) to flow from the z side to the +z side. Moreover, parts of the magnetic flux B40B(x) tend to pass, from the +z side to the −z side, respectively through the inside of the coil 40B(x−1) and the inside of the coil 40B(x+1). On the other hand, magnetic fluxes B44B(x, 1), B44B(x, 2), B44B(x+1, 1) and B44B(x+1, 2) are generated respectively inside the four coils 44B(x, 1), 44B(x, 2), 44B(x+1, 1) and 44B(x+1, 2) to flow from the +z side to the −z side. Moreover, part of the magnetic flux B44B(x, 1) and part of the magnetic flux B44B(x, 2) tend to pass through the inside of the coil 40B(x−1) from the −z side to the +z side. Similarly, part of the magnetic flux B44B(x+1, 1) and part of the magnetic flux B44B(x+1, 2) tend to pass through the inside of the coil 40B(x+1) from the −z side to the +z side.

When the power transmission circuit 30 causes electric current to flow clockwise through the coil 40B(x) as viewed from the +z side and electric currents to flow counterclockwise respectively through the four coils 44B(x, 1), 44B(x, 2), 44B(x+1, 1) and 44B(x+1, 2) surrounding the coil 40B(x) as viewed from the +z side, the directions of the magnetic fluxes are opposite to those shown in FIG. 6.

The direction in which the magnetic flux B40B(x) tends to pass through the coil 40B(x−1) is opposite to the directions in which the magnetic fluxes B44B(x, 1) and B44B(x, 2) tend to pass through the coil 40B(x−1). Consequently, magnetic flux passing through the inside of the coil 40B(x−1) becomes small due to repulsion or cancellation between the magnetic flux B40B(x) and the magnetic fluxes B44B(x, 1) and B44B(x, 2). That is, during the electric power transfer using the coil 40B(x), the coils 44B(x, 1) and 44B(x, 2) together function as a magnetic flux reduction structure to reduce magnetic flux that would cause induced current to be generated in the coil 40B(x−1). As a result, induced current is hardly generated in the coil 40B(x−1). Moreover, it is difficult for the coil 40B(x−1) to be electromagnetically coupled to the coil 40B(x); therefore, it is difficult for the coil 40B(x−1) to affect the impedance of the coil 40B(x).

Similarly, the direction in which the magnetic flux B40B(x) tends to pass through the coil 40B(x+1) is opposite to the directions in which the magnetic fluxes B44B(x+1, 1) and B44B(x+1, 2) tend to pass through the coil 40B(x+1). Consequently, magnetic flux passing through the inside of the coil 40B(x+1) becomes small due to repulsion or cancellation between the magnetic flux B40B(x) and the magnetic fluxes B44B(x+1, 1) and B44B(x+1, 2). That is, during the electric power transfer using the coil 40B(x), the coils 44B(x+1, 1) and 44B(x+1, 2) together function as a magnetic flux reduction structure to reduce magnetic flux that would cause induced current to be generated in the coil 40B(x+1). As a result, induced current is hardly generated in the coil 40B(x+1). Moreover, it is difficult for the coil 40B(x+1) to be electromagnetically coupled to the coil 40B(x); therefore, it is difficult for the coil 40B(x+1) to affect the impedance of the coil 40B(x). As described above, in the third embodiment, it is difficult for the electric power supplied to the coil 40B(x) to leak to the coils 40B(x−1) and 40B(x+1). Consequently, it becomes possible to suppress loss of the supplied electric power. Moreover, it is difficult for the coils 40B(x−1) and 40B(x+1) to be electromagnetically coupled to the coil 40B(x); therefore, it is difficult for the coils 40B(x−1) and 40B(x+1) to affect the impedance of the coil 40B(x).

Fourth Embodiment

Figure 7A:
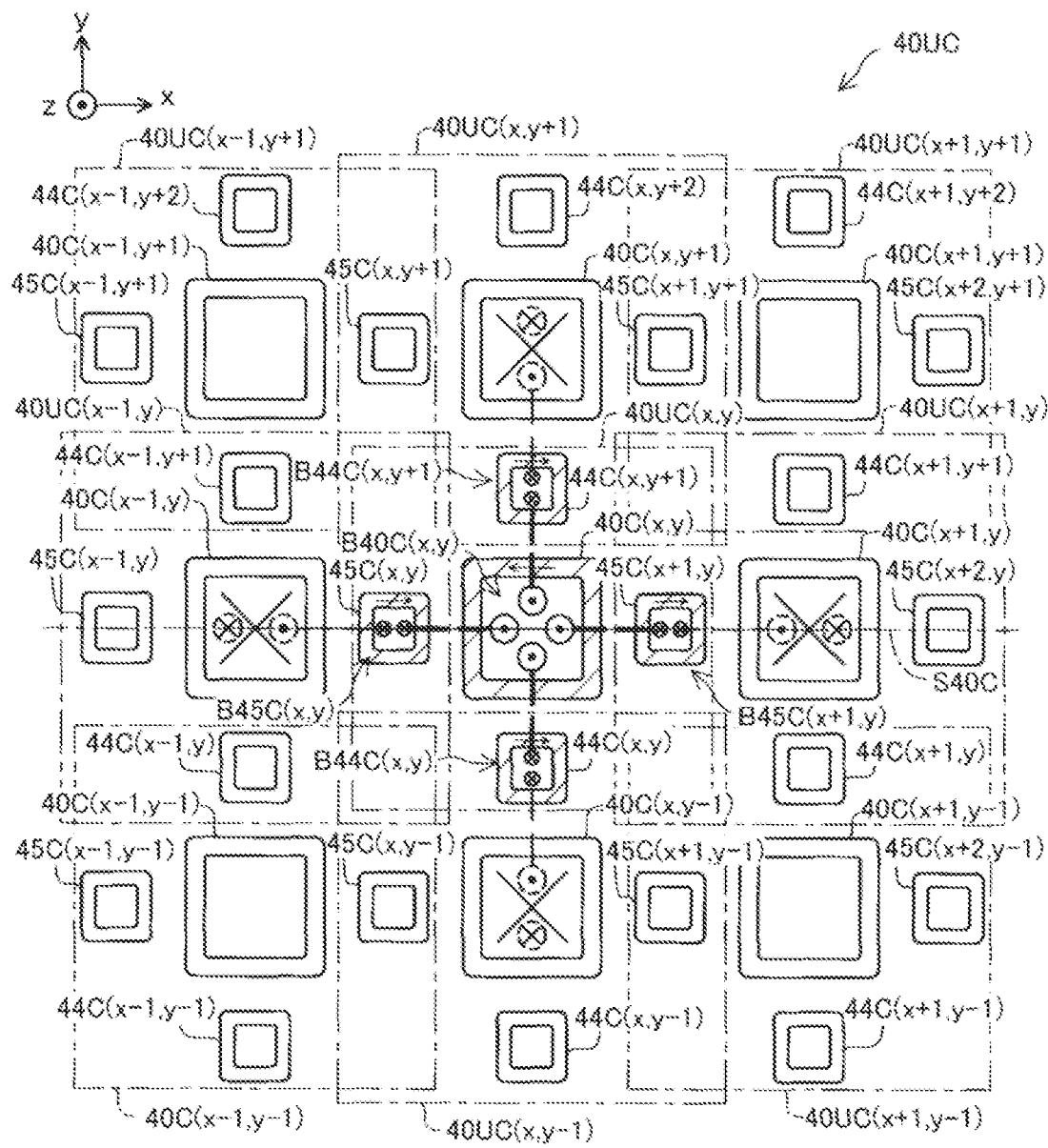
FIG. 7A is an explanatory diagram illustrating a power transmission coil unit according to a fourth embodiment.
Figure 7B:
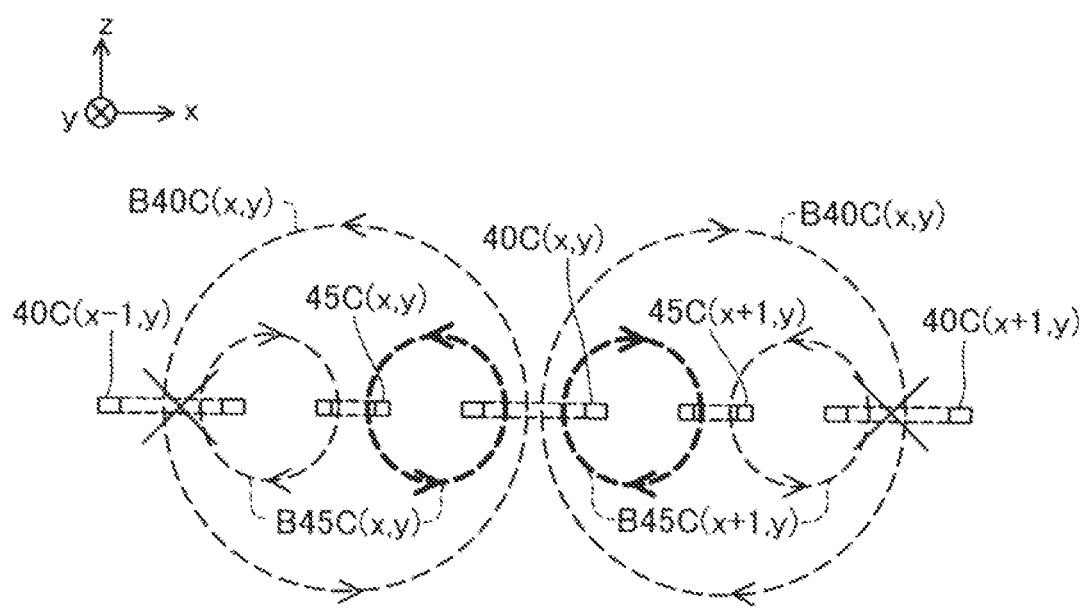
FIG. 7B is another explanatory diagram illustrating the power transmission coil unit according to the fourth embodiment.

As shown in FIGS. 7A and 7B, in the fourth embodiment, a plurality of power transmission coil units 40UC(x, y) are arranged two-dimensionally on an x-y plane. Here, x and y (x, y) are numbers respectively indicating positions in the x and y directions. Compared to the second embodiment shown in FIG. 5A, the present embodiment differs in that the vehicle 202 can be supplied with electric power even when it is deviated in a width direction of the road 105 (i.e., in the y direction).

Each power transmission coil unit 40UC(x, y) includes a coil 40C(x, y) and coils 44C(x, y), 45C(x, y), 44C(x, y+1) and 45C(x+1, y), all of which are arranged on the x-y plane. Specifically, from the viewpoint of the coil 40C(x, y), the coil 44C(x, y) is arranged on the −y side; the coil 45C(x, y) is arranged on the −x side; the coil 44C(x, y+1) is arranged on the +y side; and the coil 45C(x+1, y) is arranged on the +x side.

The coil 44C(x, y) is shared by both the power transmission coil unit 40UC(x, y−1) and the power transmission coil unit 40UC(x, y). The coil 45C(x, y) is shared by both the power transmission coil unit 40UC(x−1, y) and the power transmission coil unit 40UC(x, y). The coil 44C(x, y+1) is shared by both the power transmission coil unit 40UC(x, v) and the power transmission coil unit 40UC(x, y+1). The coil 45C(x+1, y) is shared by both the power transmission coil unit 40UC(x, y) and the power transmission coil unit 40UC(x+1, y).

The power transmission circuit 30 applies an AC voltage to the power transmission coil unit 40UC(x, y) so that the direction of electric current flowing through the coil 40C(x, y) is opposite to the directions of electric currents flowing respectively through the four coils 44C(x, y), 45C(x, y), 44C(x, y+1) and 45C(x+1, y). For example, as shown in FIGS. 7A and 7B, the power transmission circuit 30 causes electric current to flow counterclockwise through the coil 40C(x, y) as viewed from the +z side, while causing electric currents to flow clockwise respectively through the four coils 44C(x, y), 45C(x, y), 44C(x, y+1) and 45C(x+1, y) as viewed from the +z side. In this case, magnetic flux B40C(x, y) is generated inside the coil 40C(x, y) to flow from the −z side to the +z side. On the other hand, magnetic fluxes B44C(x, y), B45C(x, y), B44C(x, y+1) and B45C(x+1, y) are generated respectively inside the four coils 44C(x, y), 45C(x, y), 44C(x, y+1) and 45C(x+1, y) to flow from the +z side to the −z side.

Moreover, parts of the magnetic flux B40C(x, y) tend to pass, from the +z side to the −z side, respectively through the inside of the coil 40C(x, y−1), the inside of the coil 40C(x−1, y), the inside of the coil 40C(x, y+1) and the inside of the coil 40C(x+1, y). Parts of the magnetic flux B45C(x, y) tend to pass, from the −z side to the +z side, respectively through the inside of the coil 40C(x, y) and the inside of the coil 40C(x−1, y). Parts of the magnetic flux B45C(x+1, y) tend to pass, from the −z side to the +z side, respectively through the inside of the coil 40C(x, y) and the inside of the coil 40C(x+1, y). Parts of the magnetic flux B44C(x, y) tend to pass, from the −z side to the +z side, respectively through the inside of the coil 40C(x, y) and the inside of the coil 40C(x, y−1). Parts of the magnetic flux B44C(x, y+1) tend to pass, from the −z side to the +z side, respectively through the inside of the coil 40C(x, y) and the inside of the coil 40C(x, y+1).

When the power transmission circuit 30 causes electric current to flow clockwise through the coil 40C(x, y) as viewed from the +z side and electric currents to flow counterclockwise respectively through the four coils 44C(x, y), 45C(x, y), 44C(x, y+1) and 45C(x+1, y) as viewed from the +z side, the directions of the magnetic fluxes are opposite to those shown in FIGS. 7A and 7B.

The direction in which the magnetic flux B40C(x, y) tends to pass through the coil 40C(x−1, y) is opposite to the direction in which the magnetic flux B45C(x, y) tends to pass through the coil 40C(x−1, y). Consequently, magnetic flux passing through the inside of the coil 40C(x−1, y) becomes substantially zero due to repulsion or cancellation between the magnetic flux B40C(x, y) and the magnetic flux B45C(x, y). That is, during the electric power transfer using the coil 40C(x, y), the coil 45C(x, y) functions as a magnetic flux reduction structure to reduce magnetic flux that would cause induced current to be generated in the coil 40C(x−1, y). As a result, induced current is hardly generated in the coil 40C(x−1, y). Moreover, it is difficult for the coil 40C(x−1, y) to be electromagnetically coupled to the coil 40C(x, y); therefore, it is difficult for the coil 40C(x−1, y) to affect the impedance of the coil 40C(x, y).

Similarly, during the electric power transfer using the coil 40C(x, y), the coil 45C(x+1, y) functions as a magnetic flux reduction structure to reduce magnetic flux that would cause induced current to be generated in the coil 40C(x+1, y); the coil 44C(x, y) functions as a magnetic flux reduction structure to reduce magnetic flux that would cause induced current to be generated in the coil 40C(x, y−1); and the coil 44C(x, y+1) functions as a magnetic flux reduction structure to reduce magnetic flux that would cause induced current to be generated in the coil 40C(x, y+1). Moreover, it is difficult for the coils 40C(x+1, y), 40C(x, y−1) and 40C(x, y+1) to be electromagnetically coupled to the coil 40C(x, y); therefore, it is difficult for the coils 40C(x+1, y), 40C(x, y−1) and 40C(x, y+1) to affect the impedance of the coil 40C(x, y).

As described above, in the fourth embodiment, it is difficult for the electric power supplied to the coil 40C(x, y) to leak to the coils 40C(x−1, y), 40C(x+1, y), 40C(x, y−1) and 40C(x, y+1). Consequently, it becomes possible to suppress loss of the supplied electric power. Moreover, it is difficult for the coils 40C(x−1, y), 40C(x+1, y), 40C(x, y−1) and 40C(x, y+1) to be electromagnetically coupled to the coil 40C(x, y); therefore, it is difficult for the coils 40C(x−1, y), 40C(x+1, y), 40C(x, y−1) and 40C(x, y+1) to affect the impedance of the coil 40C(x, y).

In addition, as described above, in the fourth embodiment, the power transmission circuit 30 applies the AC voltage to the four coils 44C(x, y), 45C(x, y), 44C(x, y+1) and 45C(x+1, y) as well as to the coil 40C(x, y) at the same time. Alternatively, the power transmission circuit 30 may alternately execute a first cycle and a second cycle in a time-division manner. In the first cycle, the AC voltage is applied to the coils 40C(x, y), 45C(x, y) and 45C(x+1, y), thereby causing electric currents to flow respectively through them. On the other hand, in the second cycle, the AC voltage is applied to the coils 40C(x, y), 44C(x, y) and 44C(x, y+1), thereby causing electric currents to flow respectively through them. Through the execution of the first cycle, it is possible to achieve the same advantageous effects as described in the second embodiment when the vehicle 202 moves in the x direction. Moreover, through the execution of the second cycle, it is possible to achieve the same advantageous effects as described in the second embodiment when the vehicle 202 moves in the y direction.

Fifth Embodiment

Figure 8:
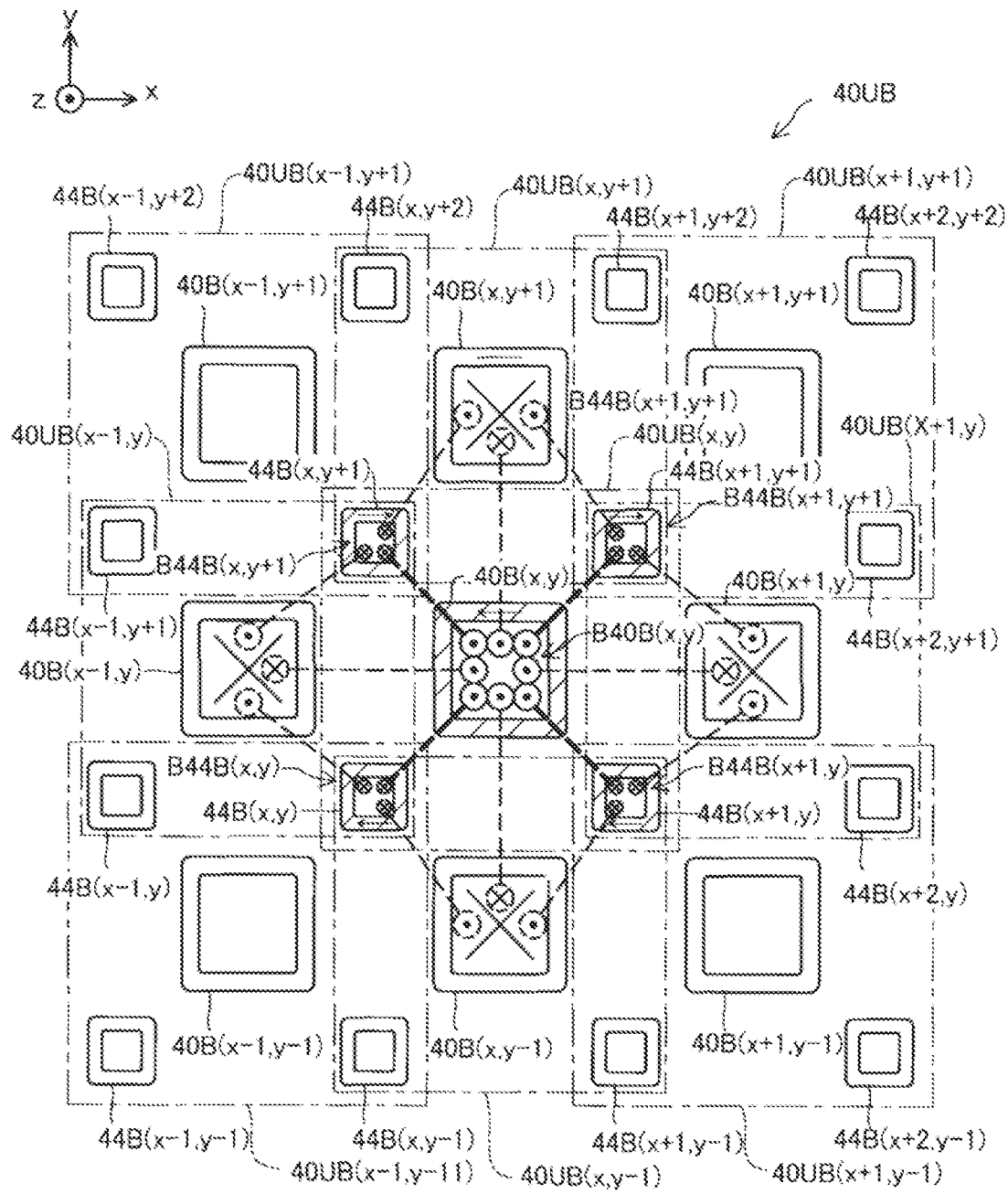
FIG. 8 is an explanatory diagram illustrating a power transmission coil unit according to a fifth embodiment.

As shown in FIG. 8, power transmission coil units 40UB(x, y) according to the fifth embodiment has a configuration obtained by extending the configuration of the power transmission coil units 40UB(x) according to the third embodiment to two dimensions. That is, the power transmission coil units 40UB(x, y) according to the fifth embodiment are configured to be capable of supplying electric power to the vehicle 202 even when the vehicle 202 is deviated in the width direction of the road 105 (i.e., in the y direction). As described above, in the third embodiment, when the AC voltage is applied to the coil 40B(x), it is difficult for the electric power supplied to the coil 40B(x) to leak to the coils 40B(x−1) and 40B(x+1) in the x direction; and it is difficult for the coils 40B(x−1) and 40B(x+1) to affect the impedance of the coil 40B(x). Similarly, in the fifth embodiment, when an AC voltage is applied to a coil 40B(x, y), it is difficult for the electric power supplied to the coil 40B(x, y) to leak to coils 40B(x−1, y) and 40B(x+1, y) in the x direction; and it is also difficult for the electric power supplied to the coil 40B(x, y) to leak to coils 40B(x, y−1) and 40B(x, y+1) in the y direction. Moreover, it is difficult for the coils 40B(x−1, y) and 40B(x+1, y) to affect the impedance of the coil 40B(x, y); and it is also difficult for the coils 40B(x, y−1) and 40B(x, y+1) to affect the impedance of the coil 40B(x, y).

As described above, in the fifth embodiment, it is difficult for the electric power supplied to the coil 40B(x, y) to leak to the coils 40B(x−1, y), 40B(x+1, y), 40B(x, y−1) and 40B(x, y+1). Consequently, it becomes possible to suppress loss of the supplied electric power. Moreover, it is difficult for the coils 40B(x−1, y), 40B(x+1, y), 40B(x, y−1) and 40B(x, y+1) to be electromagnetically coupled to the coil 40B(x, y); therefore, it is difficult for the coils 40B(x−1, y), 40B(x+1, y), 40B(x, y−1) and 40B(x, y+1) to affect the impedance of the coil 40B(x, y).

Sixth Embodiment

Figure 9A:
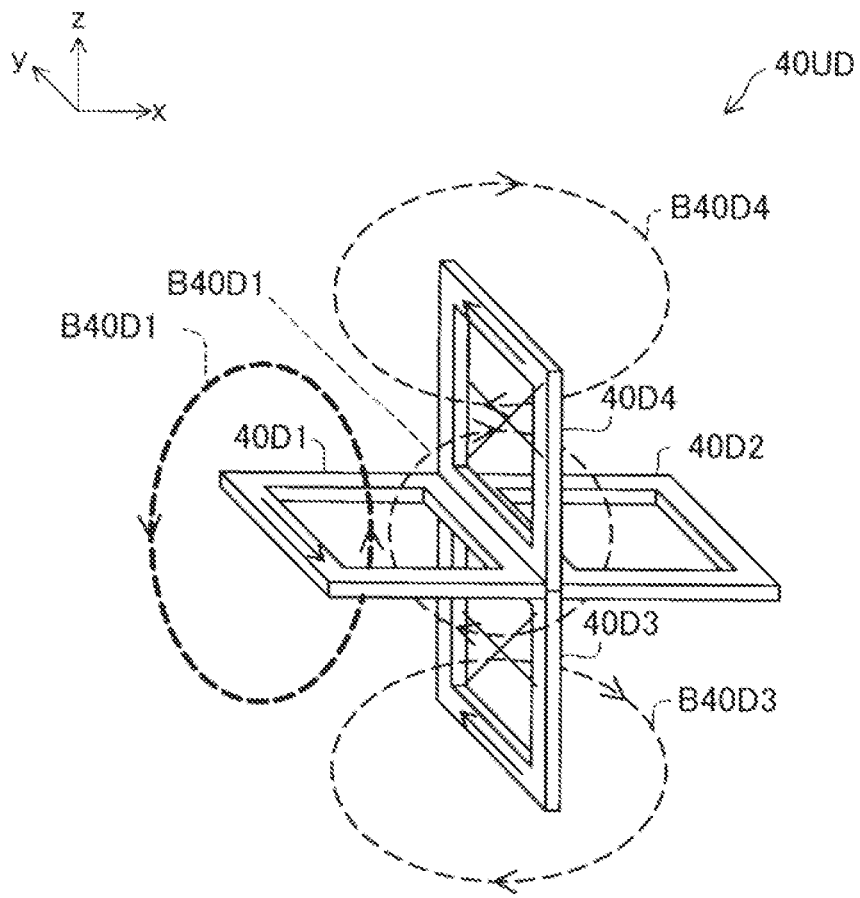
FIG. 9A is an explanatory diagram illustrating a power transmission coil unit according to a sixth embodiment.

FIG. 9A illustrates the configuration of a power transmission coil unit 40UD according to the sixth embodiment. The power transmission coil unit 40UD includes four coils 40D1, 40D2, 40D3 and 40D4. Both the coils 40D1 and 40D2 are arranged on an x-y plane; and the coil 40D 2 is located on the +x side of the coil 40D1. On the other hand, both the coils 40D3 and 40D4 are arranged on a y-z plane that includes a boundary between the coils 40D1 and 40D2; and the coil 40D 3 is located on the −z side of the boundary between the coils 40D1 and 40D2, whereas the coil 40D4 is located on the +z side of the boundary between the coils 40D1 and 40D2.

Figure 9B:
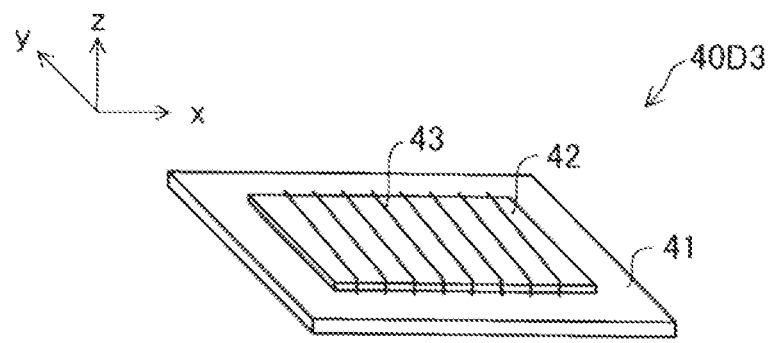
FIG. 9B is an explanatory diagram illustrating the configuration of a coil of the power transmission coil unit according to the sixth embodiment.

Each of the coils 40D1 and 40D2 has its winding 43 wound on a surface of a core 42 on the opposite side to a base plate 41, as shown in FIG. 4. On the other hand, each of the coils 40D3 and 40D4 has its winding 43 wound around a core 42, as shown in FIG. 9B. Moreover, the base plates 41 of the coils 40D1, 40D2, 40D3 and 40D4 can be installed substantially parallel to the surface of the road 105; therefore, the coils 40D1, 40D2, 40D3 and 40D4 can be installed in the road 105 without digging the road 105 deep.

In the present embodiment, the power transmission circuit 30 applies an AC voltage to the coils 40D1, 40D3 and 40D4. For example, as shown in FIG. 9A, the power transmission circuit 30 causes electric current to flow counterclockwise through the coil 40D1 as viewed from the −z side, while causing electric current to flow counterclockwise through the coil 40D3 as viewed from the +x side and electric current to flow clockwise through the coil 40D4 as viewed from the +x side.

When electric current flows counterclockwise through the coil 40D1 as viewed from the +z side, closed magnetic flux B40D1 is generated which passes through the inside of the coil 40D1 from the −z side to the +z side, flows from the side to the −z side on the outside of the coil 40D1, and then passes through the inside of the coil 40D1 again from the −z side to the +z side. On the other hand, when electric current flows counterclockwise through the coil 40D3 as viewed from the +x side, closed magnetic flux B40D3 is generated which passes through the inside of the coil 40D3 from the −x side to the side, flows from the +x side to the −x side on the outside of the coil 40D3, and then passes through the inside of the coil 40D3 again from the −x side to the +x side. Moreover, when electric current flows clockwise through the coil 40D4 as viewed from the +x side, closed magnetic flux B40D4 is generated which passes through the inside of the coil 40D4 from the +x side to the −x side, flows from the −x side to the +x side on the outside of the coil 40D4, and then passes through the inside of the coil 40D4 again from the +x side to the −x side. The directions of those parts of the magnetic flux B40D1 which tend to pass respectively through the inside of the coil 40D3 and the inside of the coil 40D4 are respectively opposite to the directions of the magnetic flux B40D3 generated inside the coil 40D3 and the magnetic flux B40D4 generated inside the coil 40D4. Therefore, the magnetic flux B40D1 repels the magnetic fluxes B40D3 and B40D4; thus it is difficult for the magnetic flux B40D1 to pass through the coils 40D3 and 40D4. Accordingly, it is difficult for the magnetic flux B40D1 to pass through the coil 40D2.

When the power transmission circuit 30 causes electric current to flow clockwise through the coil 40D1 as viewed from the +z side, electric current to flow clockwise through the coil 40D3 as viewed from the +x side and electric current to flow counterclockwise through the coil 40D4 as viewed from the +x side, the directions of the magnetic fluxes are opposite to those shown in FIG. 9A.

As described above, it is difficult for the magnetic flux B40D1 generated by the coil 40D1 to pass through the coil 40D2. That is, during the electric power transfer using the coil 40D1, the coils 40D3 and 40D4 together function as a magnetic flux reduction structure to reduce magnetic flux that would cause induced current to be generated in the coil 40D2 adjacent to the coil 40D1. As a result, the magnetic flux B40D1 hardly causes induced current to be generated in the coil 40D2.

As described above, in the sixth embodiment, it is difficult the electric power supplied to the coil 40D1 to leak to the coil 40D2. Consequently, it becomes possible to suppress loss of the supplied electric power. Moreover, it is difficult for the coil 40D2 to be electromagnetically coupled to the coil 40D1; therefore, it is difficult for the coil 40D2 to affect the impedances of the coil 40D1.

Seventh Embodiment

Figure 10:
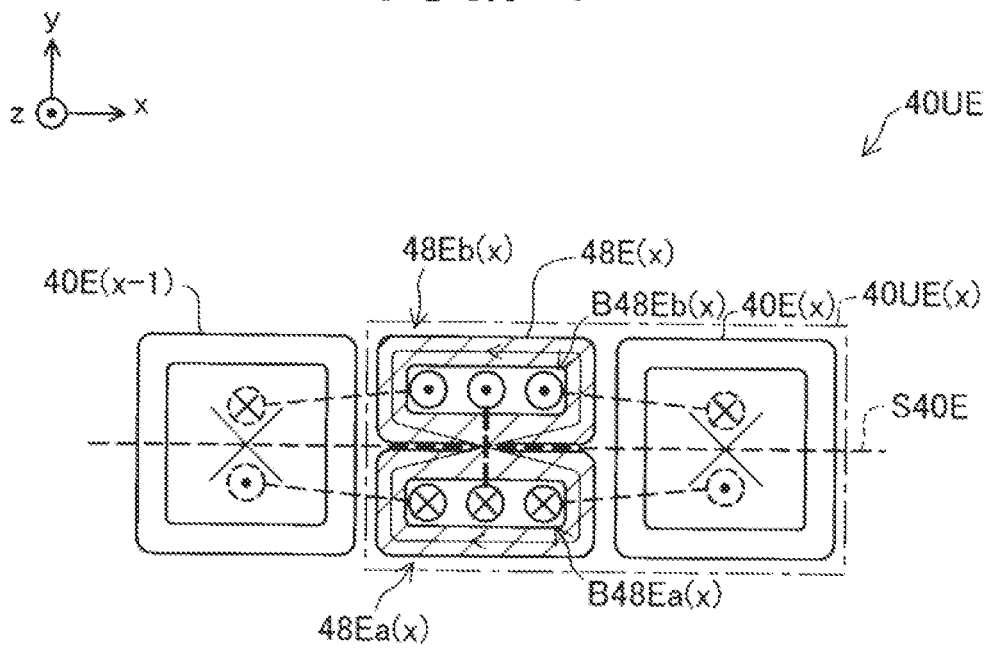
FIG. 10 is an explanatory diagram illustrating a power transmission coil unit according to a seventh embodiment.

As shown in FIG. 10, in the seventh embodiment, the power supply apparatus 100 includes a plurality of power transmission coil units 40UE(x) arranged in the x direction. Here, x in (x) is a number indicating a position in the x direction. Each power transmission coil unit 40UE(x) includes a coil 48E(x) and a coil 40E(x). Further, the coil 48E(x) has a first coil section 48Ea(x) and a second coil section 48Eb(x) wound in opposite directions to each other as viewed from the +z side. The second coil section 48Eb(x) is located on the +y side of the first coil section 48Ea(x). The first coil section 48Ea(x) and the second coil section 48Eb(x) are symmetrical with respect to a symmetry plane S40E that is a z-x plane. The coil 40E(x) is arranged on the +x side of the coil 48E(x) on an x-y plane. Moreover, the coil 40E(x) is also symmetrical with respect to the symmetry plane S40E. On the +x side of the coil 40E(x), there is arranged a coil 48E(x+1).

Suppose that the power transmission circuit 30 applies an AC voltage to be coil 48E(x). The two coil sections 48Ea(x) and 48Eb(x) of the coil 48E(x) are formed of a continuous electrical conductor wire. The winding direction of one of the two coil sections 418Ea(x) and 48Eb(x) is clockwise as viewed from the +z side, whereas the winding direction of the other of the two coil sections 48Ea(x) and 48Eb(x) is counterclockwise as viewed from the +z side. The coil 48E(x) may be wound such that the first coil section 48Ea(x) is wound one turn and then the second coil section 418Eb(x) is wound one turn in the opposite direction to the first coil section 48Ea(x); that is, the coil 48E(x) may be wound in the shape of the Arabic numeral "8". Alternatively, the coil 48E(x) may be wound such that the first coil section 48Ea(x) is wound completely and then the second coil section 418Eb(x) is wound completely in the opposite direction to the first coil section 48Ea(x). Otherwise, the coil 48E(x) may be wound such that the first coil section 48Ea(x) is wound n turns and then the second coil section 48Eb(x) is wound n turns in the opposite direction to the first coil section 48Ea(x). Since the winding directions of the two coil sections 48Ea(x) and 48Eb(x) are opposite to each other as viewed from the +z side, when the power transmission circuit 30 causes electric current to flow clockwise through the first coil section 48Ea(x) as viewed from the +z side, as shown in FIG. 10, the electric current flows counterclockwise through the second coil section 48Eb(x) as viewed from the +z side. In this case, magnetic flux B48Ea(x) is generated inside the first coil section 48Ea(x) to flow from the +z side to the −z side, while magnetic flux B48Eb(x) is generated inside the second coil section 48Eb(x) to flow from the −z side to the +z side. The magnetic flux B48Ea(x) and the magnetic flux B48Eb(x) together form closed magnetic flux along a y-z plane. Moreover, parts of the magnetic flux B48Ea(x) tend to pass, from the −z side to the +z side, respectively through the inside of the coil 40E(x−1) and the inside of the coil 40E(x) on the −y side of the symmetry plane S40E. On the other hand, parts of the magnetic flux B48Eb(x) tend to pass, from the +z side to the −z side, respectively through the inside of the coil 40E(x−1) and the inside of the coil 40E(x) on the +y side of the symmetry plane S40E. In addition, when the power transmission circuit 30 causes electric current to flow counterclockwise through the first coil section 48Ea(x) and clockwise through the second coil section 48Eb(x) as viewed from the +z side, the directions of the magnetic fluxes are opposite to those shown in FIG. 10.

The direction in which the magnetic flux B48Ea(x) tends to pass through the inside of the coil 40E(x) is opposite to the direction in which the magnetic flux B48Eb(x) tends to pass through the inside of the coil 40E(x). Consequently, magnetic flux passing through the inside of the coil 40E(x) becomes small due to repulsion or cancellation between the magnetic flux B48Ea(x) and the magnetic flux B48Eb(x). The same applies to the magnetic fluxes tending to pass through the inside of the coil 40E(x−1). Consequently, during the electric power transfer using the coil 48E(x), the first coil section 48Ea(x) and the second coil section 48Eb(x) together function as a magnetic flux reduction structure to reduce magnetic flux that would cause induced current to be generated in the coils 40E(x−1) and 40E(x) adjacent to the coil 48E(x). As a result, induced current is hardly generated in the coils 40E(x−1) and 40E(x). That is, it is difficult for the electric power supplied to the coil 48E(x) to leak to the coils 40E(x−1) and 40E(x). Moreover, it is difficult for the coils 40E(x−1) and 40E(x) to be electromagnetically coupled to the coil 48E(x); therefore, it is difficult for the coils 40E(x−1) and 40E(x) to affect the impedance of the coil 48E(x).

As described above, in the seventh embodiment, it is difficult for the electric power supplied to the coil 48E(x) to leak to the coils 40E(x−1) and 40E(x). Consequently, it becomes possible to suppress loss of the supplied electric power.

Eighth Embodiment

Figure 11A:
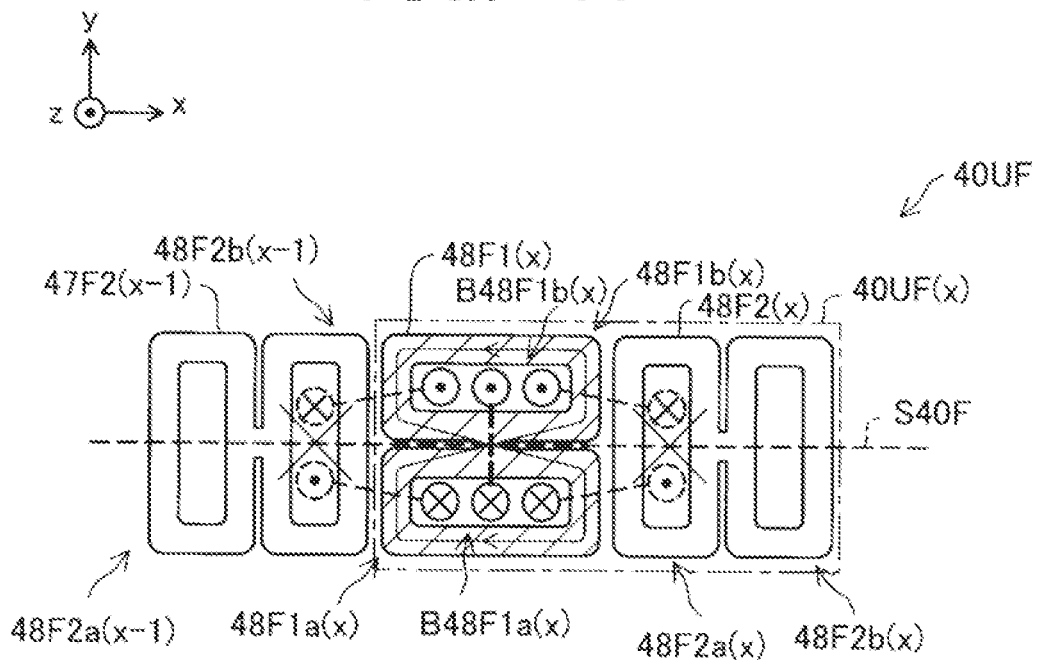
FIG. 11A is an explanatory diagram illustrating a power transmission coil unit according to an eighth embodiment.
Figure 11B:
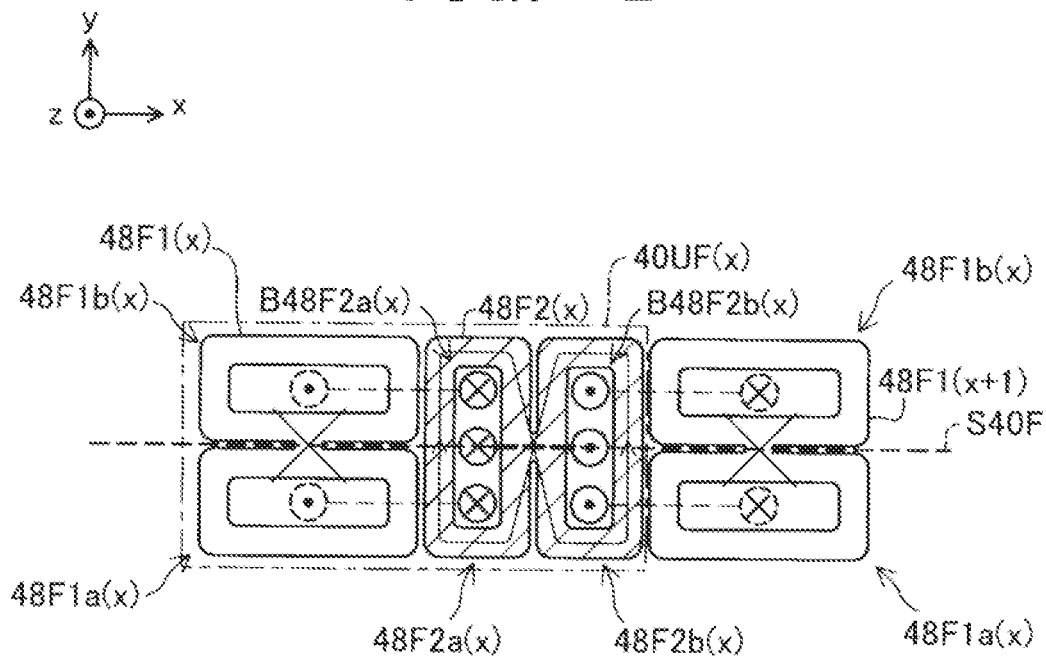
FIG. 11B is another explanatory diagram illustrating the power transmission coil unit according to the eighth embodiment.

As shown in FIGS. 11A and 11B, in the eighth embodiment, the power supply apparatus 100 includes a plurality of power transmission coil units 40UF(x) arranged in the x direction. The power transmission coil units 40UF(x) differ from the power transmission coil units 40UE(x) described in the seventh embodiment with reference to FIG. 10 in that each power transmission coil unit 40UF(x) includes a pair of coils 48F1(x) and 48F2(x) each of which has two coil sections. Specifically, the coil 48F1(x) has a first coil section 48F1a(x) and a second coil section 48F1b(x) wound in opposite directions to each other on an x-y plane as viewed from the +z side. On the other hand, the coil 48F2(x) has a third coil section 48F2a(x) and a fourth coil section 48F2b(x) wound in opposite directions to each other on the x-y plane as viewed from the +z side. Moreover, the coil 48F2(x) is arranged such that it is rotated by 90° with respect to the coil 48F1(x) as viewed along the z direction. Specifically, the third coil section 48F2a(x) of the coil 48F2(x) is arranged on the side of the coil 48F1(x); and the fourth coil section 48F2b(x) of the coil 48F2(x) is arranged on the +x side of the third coil section 48F2a(x). That is, the direction in which the first and second coil sections 48F1a(x) and 48F1b(x) of the coil 48F1(x) are aligned and the direction in which the third and fourth coil sections 48F2a(x) and 48F2b(x) of the coil 48F2(x) are aligned intersect each other. In addition, in the case of the coils 48F1(x) and 48F2(x) being not on the same plane, the direction in which the first and second coil sections 48F1a(x) and 48F1b(x) of the coil 48F1(x) are aligned and the direction in which the third and fourth coil sections 48F2a(x) and 48F2b(x) of the coil 48F2(x) are aligned may be skew to each other.

Suppose that the power transmission circuit 30 applies an AC voltage to the coil 48F1(x). Since the first and second coil sections 48F1a(x) and 48F1b(x) of the coil 48F1(x) are wound in opposite directions to each other as viewed from the +z side, when the power transmission circuit 30 causes electric current to flow clockwise through the first coil section 48F1a(x) as viewed from the +z side, as shown in FIG. 11A, the electric current flows counterclockwise through the second coil section 48F1b(x) as viewed from the +z side. In this case, magnetic flux B48F1a(x) is generated inside the first coil section 48F1a(x) to flow from the +z, side to the −z side, while magnetic flux B48F1b(x) is generated inside the second coil section 48F1b(x) to flow from the −z side to the +z side. Moreover, parts of the magnetic flux B48F1a(x) tend to pass, from the −z side to the +z side, respectively through the inside of the third coil section 48F2a(x) and the inside of the coil section 48F2b(x−1) on the −y side of the symmetry plane S40F. On the other hand, parts of the magnetic flux B48F1b(x) tend to pass, from the +z side to the −z side, respectively through the inside of the third coil section 48F2a(x) and the inside of the coil section 48F2b(x−1) on the +z side of the symmetry plane S40F. In addition, when the power transmission circuit 30 causes electric current to flow counterclockwise through the first coil section 48F1a(x) and clockwise through the second coil section 48F1b(x) as viewed from the +z side, the directions of the magnetic fluxes are opposite to those shown in FIG. 11A.

The direction in which the magnetic flux B48F1a(x) tends to pass through the inside of the third coil section 48F2a(x) of the coil 48F2(x) is opposite to the direction in which the magnetic flux B48F1b(x) tends to pass through the inside of the third coil section 48F2a(x) of the coil 48F2(x). Consequently, magnetic flux passing through the inside of the third coil section 48F2a(x) of the coil 48F2(x) becomes small due to repulsion or cancellation between the magnetic flux B48F1a(x) and the magnetic flux B48F1b(x). The same applies to the magnetic fluxes tending to pass through the inside of the fourth coil section 48F2b(x−1) of the coil 48F2(x−1). Consequently, during the electric power transfer using the coil 48F1(x), the first coil section 48F1a(x) and the second coil section 48F1b(x) together function as a magnetic flux reduction structure to reduce magnetic flux that would cause induced current to be generated in the coils 48F2(x−1) and 48F2(x) adjacent to the coil 48F1(x). As a result, induced current is hardly generated in the coils 48F2(x−1) and 48F2(x). That is, it is difficult for the electric power supplied to the coil 48F1(x) to leak to the coils 48F2(x−1) and 48F2(x). Moreover, it is difficult for the coils 48F2(x−1) and 48F2(x) to be electromagnetically coupled to the coil 48F1(x); therefore, it is difficult for the coils 48F2(x−1) and 48F2(x) to affect the impedance of the coil 48F1(x).

Next, suppose that the power transmission circuit 30 applies an AC voltage to the coil 48F2($x$). Since the third and fourth coil sections 48F2$a$($x$) and 48F2$b$($x$) of the coil 48F2($x$) are wound in opposite directions to each other as viewed from the +z side, when the power transmission circuit 30 causes electric current to flow clockwise through the third coil section 48F2$a$($x$) as viewed from the +z side, as shown in FIG. 11B, the electric current flows counterclockwise through the fourth coil section 48F2$b$($x$) as viewed from the +z side. In this case, magnetic flux B48F2$a$ ($x$) is generated inside the third coil section 48F2$a$($x$) to flow from the +z side to the −z side, while magnetic flux B48F2$b$($x$) is generated inside the fourth coil section 48F2$b$ ($x$) to flow from the −z side to the +z side. Moreover, parts of the magnetic flux B48F2$a$($x$) tend to pass, from the −z side to the +z side, respectively, through the inside of the first coil section 48F1$a$($x$) of the coil 48F1($x$) and the inside of the second coil section 48F1$b$($x$) of the coil 48F1($x$). On the other hand, parts of the magnetic flux B48F2$b$($x$) tend to pass, from the +z side to the −z side, respectively through the inside of the first coil section 48F1$a$($x$+1) of the coil 48F1($x$+1) and the inside of the second coil section 48F1$b$ ($x$+1) of the coil 48F1($x$+1).

In the eighth embodiment, change in the magnetic flux B48F2$a$($x$) causes clock wise induced current to be generated in the first coil section 48F1$a$($x$) while causing counterclockwise induced current to be generated in the second coil section 48F1$b$($x$). From the point of view of the entire coil 48F1($x$), the direction of the induced current to be generated in the first coil section 48F1$a$($x$) and the direction of the induced current to be generated in the second coil section 48F1$b$($x$) are opposite to each other; therefore, the induced current to be generated in the first coil section 48F1$a$($x$) and the induced current to be generated in the second coil section 48F1$b$($x$) cancel each other out. Consequently, induced current is hardly generated in the coil 48F1($x$). Similarly, induced current is hardly generated in the coil 48F1($x$+1). In addition, when the power transmission circuit 30 causes electric current to flow counterclockwise through the third coil section 48F2$a$($x$) and clockwise through the fourth coil section 48F2$b$($x$) as viewed from the +z side, the directions of the magnetic fluxes are opposite to those shown in FIG. 11B. In this case, induced current is also hardly generated in the coils 48F1($x$) and 48F1($x$+1).

During the electric power transfer using the coil 48F2($x$), the coil 48F2($x$) also functions as a magnetic flux reduction structure to reduce magnetic flux that would cause induced current to be generated in the coils 48F1($x$) and 48F1($x$+1). Therefore, it is difficult for the electric power supplied to the coil 48F2($x$) to leak to the coils 48F1($x$) and 48F1($x$+1). Moreover, it is difficult for the coils 48F1($x$) and 48F1($x$+1) to be electromagnetically coupled to the coil 48F2($x$); therefore, it is difficult for the coils 48F1($x$) and 48F1($x$+1) to affect the impedance of the coil 48F2($x$).

As described above, in the eighth embodiment, the direction in which the first and second coil sections 48F1$a$($x$) and 48F1$b$($x$) of the coil 48F1($x$) are aligned and the direction in which the third and fourth coil sections 48F2$a$($x$) and 48F2$b$($x$) of the coil 48F2($x$) are aligned intersect each other; therefore, it is difficult for the electric power supplied to the coil 48F1($x$) to leak to the coils 48F2($x$−1) and 48F2($x$) and for the electric power supplied to the coil 48F2($x$) to leak to the coils 48F1($x$) and 48F1($x$+1). Consequently, it becomes possible to suppress loss of the supplied electric power. Moreover, it is difficult for the coils 48F2($x$−1) and 48F2($x$) to be electromagnetically coupled to the coil 48F1($x$); and it is difficult for the coils 48F1($x$) and 48F1($x$+1) to be electromagnetically coupled to the coil 48F2($x$). Therefore, it is difficult for the impedances of the coils 48F1($x$) and 48F2($x$) to be affected by other coils adjacent to them.

Ninth Embodiment

Figure 12:
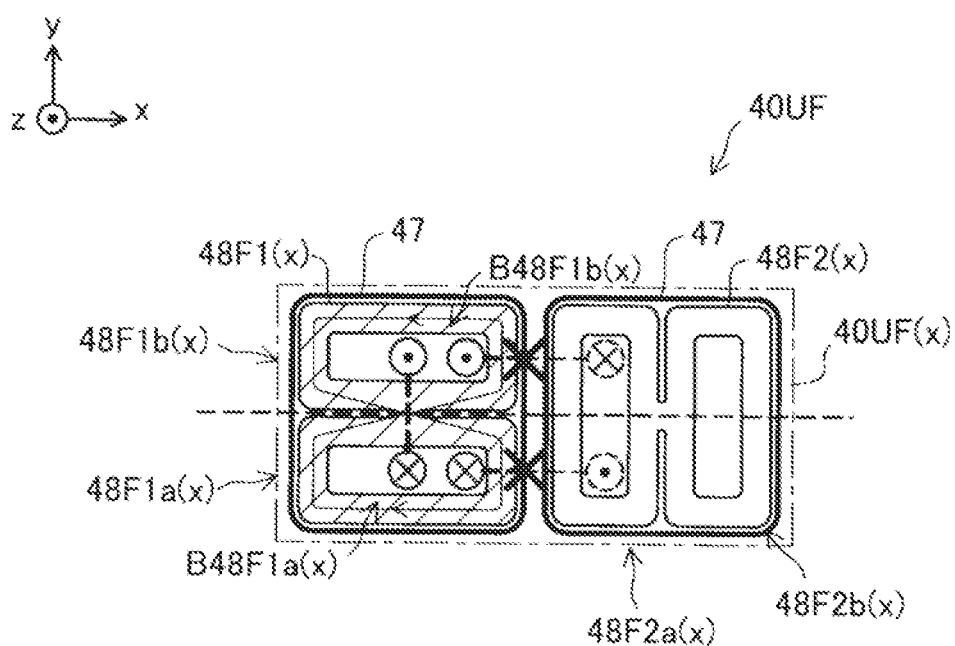
FIG. 12 is an explanatory diagram illustrating a power transmission coil unit according to a ninth embodiment.

Compared to the eighth embodiment, the ninth embodiment differs in that each power transmission coil unit 40UF further includes, as shown in FIG. 12, shields 47 provided respectively on the outer peripheries of the coils 48F1($x$) and 48F2($x$) as viewed along the z direction. The shields 47 may be formed of, for example, a ferromagnetic material. The height of the shields 47 in the z direction is greater than or equal to the thickness of the coils 48F1($x$) and 48F2($x$) in the z direction.

In the ninth embodiment, it is difficult for the magnetic fluxes B48F1$a$($x$) and B48F1$b$($x$) generated by application of an AC voltage to the coil 48F1($x$) to leak out of the shield 47 provided on the outer periphery of the coil 48F1($x$). Therefore, it is difficult for the magnetic fluxes B48F1$a$($x$) and B48F1$b$($x$) to pass through the third coil section 48F2$a$ ($x$) of the coil 48F2; thus it is difficult for the coil 48F2 to be electromagnetically coupled to the coil 48F1. Similarly, it is difficult for the magnetic fluxes B48F2$a$($x$) and B48F2$b$ ($x$) generated by application of an AC voltage to the coil 48F2($x$) to leak out of the shield 47 provided on the outer periphery of the coil 48F2($x$). Therefore, it is difficult for the magnetic fluxes B48F2$a$($x$) and B48F2$b$($x$) to pass through the first and second coil sections 48F1$a$($x$) and 48F1$b$($x$) of the coil 48F1($x$); thus it is difficult for the coil 48F1($x$) to be electromagnetically coupled to the coil 48F2. In addition, in the ninth embodiment, even if the magnetic fluxes B48F1$a$ ($x$) and B48F1$b$($x$) could leak out of the shield 47, it would still be possible to achieve the same advantageous effects as in the eighth embodiment. That is, in the ninth embodiment, it is possible to further suppress loss of the supplied electric power than in the eighth embodiment. In the example shown in FIG. 12, two shields 47 are provided respectively on the outer peripheries of the coils 48F1($x$) and 48F2($x$). Alternatively, one shield 47 may be provided on the outer periphery of only one of the coils 48F1($x$) and 48F2($x$). In this case, it would be possible to block or reduce the magnetic fluxes flowing into or out of the one of the coils 48F1($x$) and 48F2($x$).

Tenth Embodiment

Figure 13:
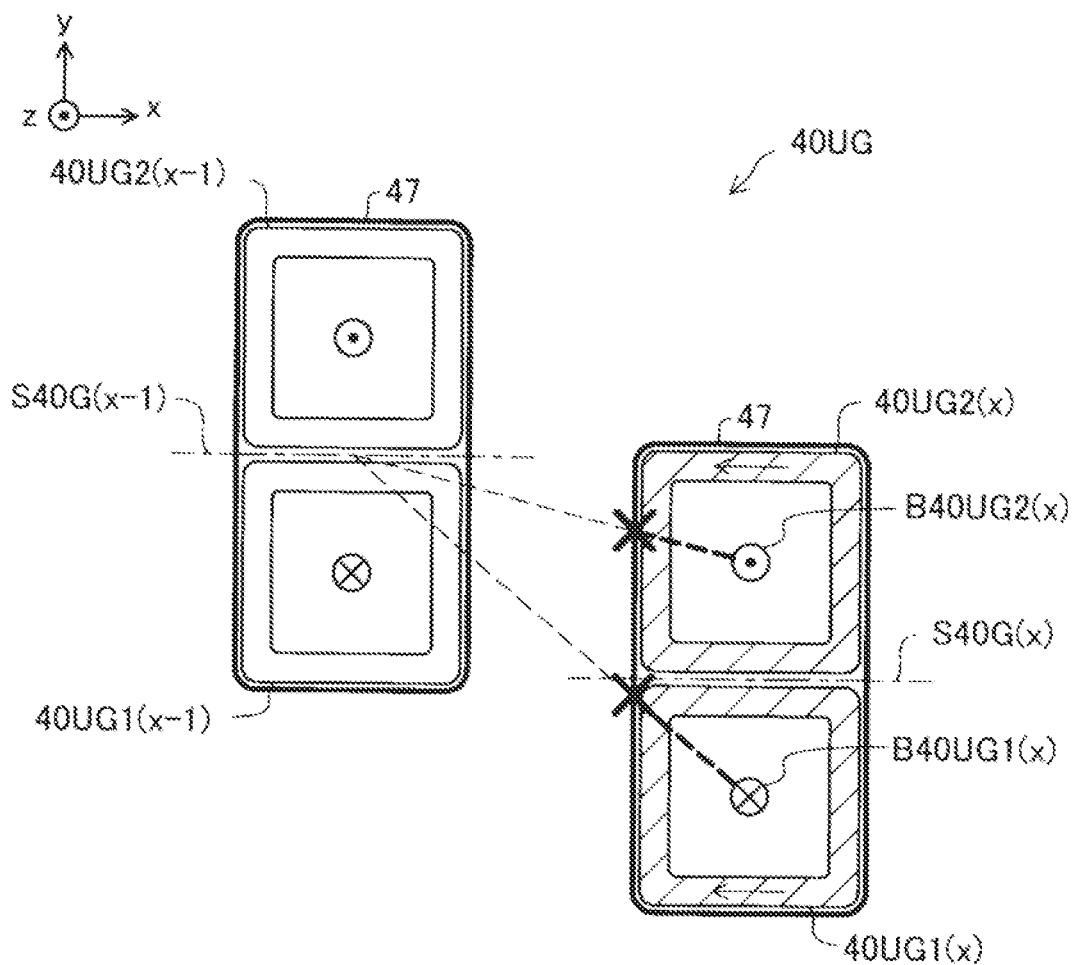
FIG. 13 is an explanatory diagram illustrating a power transmission coil unit according to a tenth embodiment.

As shown in FIG. 13, in the tenth embodiment, the power supply apparatus 100 includes a plurality of power transmission coil units 40UG($x$). Each power transmission coil unit 40UG($x$) includes a pair of coils 40UG1($x$) and 40UG2 ($x$) and a shield 47. Both the coils 40UG1($x$) and 40UG2($x$) are arranged on an x-y plane; and the coil 40UG2($x$) is located on the +y side of the coil 40UG1($x$). The coils 40UG1($x$) and 40UG2($x$) have the same shape as viewed from the +z side; and the number of turns of the coil 40UG1($x$) is equal to the number of turns of the coil 40UG2($x$). Moreover, the coils 40UG1($x$) and 40UG2($x$) are symmetrical with respect to a symmetry plane S40G($x$) that is a z-x plane. The shield 47 surrounds the outer peripheries of the coils 40UG1($x$) and 40UG2($x$), so as to suppress magnetic fluxes generated inside the coils 40UG1($x$) and 40UG2($x$) from leaking out of the shield 47. The power transmission coil unit 40UG($x$−1) has the same configuration as the power transmission coil unit 40UG($x$). In addition, in the example shown in FIG. 13, a symmetry plane S40G($x$−1), with respect to which coils 40UG1($x$−1) and 40UG2($x-1$) of the power transmission coil unit 40UG($x-1$) are symmetrical, is different from the symmetry plane S40G($x$). However, it should be noted that the symmetry plane S40G($x-1$) may be the same as the symmetry plane S40G($x$).

Suppose that the power transmission circuit 30 applies an AC voltage to the power transmission coil unit 40UG($x$). In this case, magnetic fluxes B40UG1($x$) and B40UG2($x$) are generated respectively inside the coils 40UG1($x$) and 40UG2($x$). However, the magnetic fluxes B40UG1($x$) and B40UG2($x$) are blocked by the shield 47; therefore, it is difficult for the magnetic fluxes B40UG1($x$) and B40UG2($x$) to pass through the coils 40UG1($x-1$) and 40UG2($x-2$) of the power transmission coil unit 40UG($x-1$). Consequently, it becomes difficult for induced current to flow from the power transmission coil unit 40UG($x$) to the power transmission coil unit 40UG($x-1$). Moreover, it is difficult for the coils 40UG1($x-1$) and 40UG2($x-1$) to be electromagnetically coupled to the coils 40UG1($x$) and 40UG2($x$); therefore, it is difficult for the coils 40UG1($x-1$) and 40UG2($x-1$) to affect the impedances of the coils 40UG1($x$) and 40UG2($x$).

According to the tenth embodiment described above, it is possible to suppress loss of the supplied electric power.

Eleventh Embodiment

Figure 14:
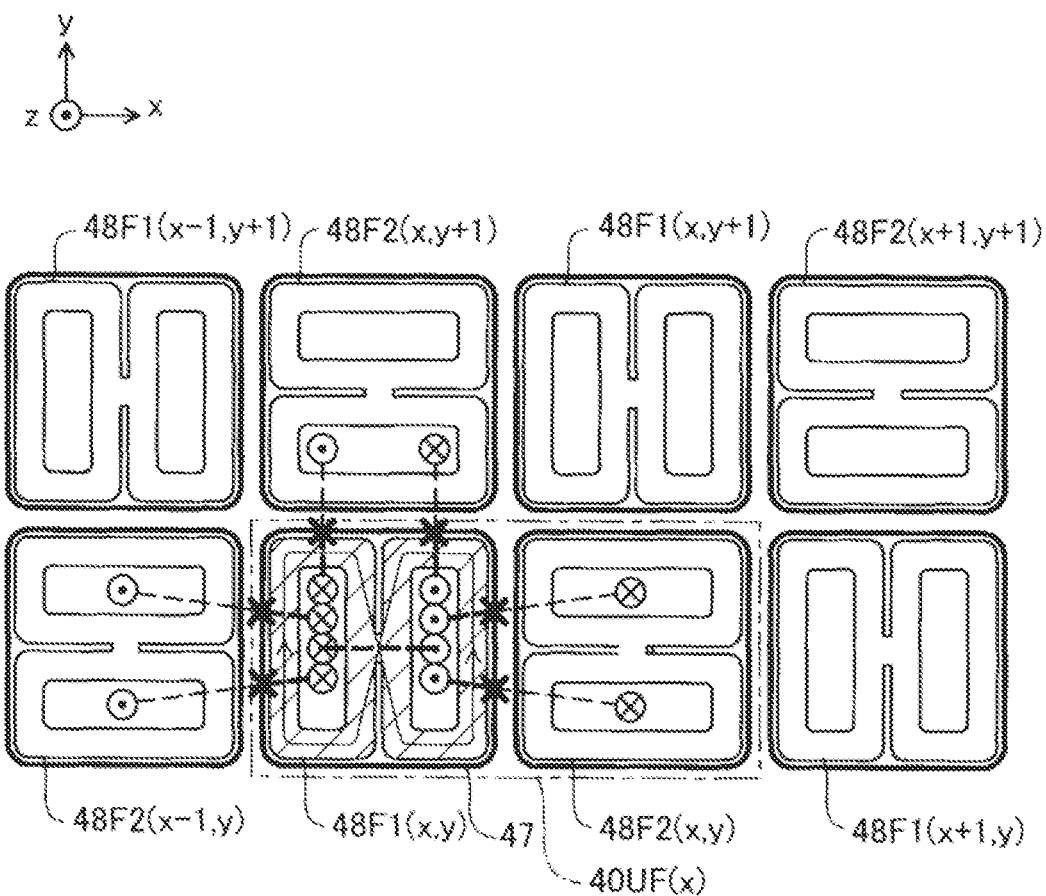
FIG. 14 is an explanatory diagram illustrating a power transmission coil unit according to an eleventh embodiment.

As shown in FIG. 14, in the eleventh embodiment, a plurality of power transmission coil units 40UF($x$) as described in the ninth embodiment are arranged two-dimensionally on an x-y plane such that the coils 48F1($x$) and 48F2($x$) of the power transmission coil units 40UF($x$) together form a checker pattern on the x-y plane.

Suppose that the power transmission circuit 30 applies an AC voltage to the coil 48F1($x, y$). In this case, for the same reason as described in the ninth embodiment, the magnetic fluxes generated inside the coil 48F1($x, y$) become small in the coils 48F2($x-1$, y), 48F2($x, y$) and 48F2($x, y+1$). As a result, it becomes difficult for the electric power supplied to the coil 48F1($x, y$) to leak to the coils 48F2($x-1$, y), 48F2($x, y$) and 48F2($x, y+1$). Moreover, it is difficult for the coils 48F2($x-1$, y), 48F2($x, y$) and 48F2($x, y+1$) to be electromagnetically coupled to the coil 48F1($x, y$); therefore, it is difficult for the coils 48F2($x-1$, y), 48F2($x, y$) and 48F2($x, y+1$) to affect the impedance of the coil 48F1($x, y$).

Furthermore, owing to the arrangement of the coils 48F1($x-1$, y+1), 48F1($x, y+1$), 48F1($x+1$, y) and 48F2($x+1$, y+1) apart from the coil 48F1($x$) and the shielding effect of the shield 47, it becomes difficult for the magnetic fluxes generated inside the coil 48F1($x, y$) to pass through the coils 48F1($x-1$, y+1), 48F1($x, y+1$), 48F1($x+1$, y) and 48F2($x+1$, y+1). As a result, it becomes difficult for the electric power supplied to the coil 48F1($x, y$) to leak to the coils 48F1($x-1$, y+1), 48F1($x, y+1$), 48F1($x+1$, y) and 48F2($x+1$, y+1). Moreover, it is difficult for the coils 48F1($x-1$, y+1), 48F1($x, y+1$), 48F1($x+1$, y) and 48F2($x+1$, y+1) to be electromagnetically coupled to the coil 48F1($x, y$); therefore, it is difficult for the coils 48F1($x-1$, y+1), 48F1($x, y+1$), 48F1($x+1$, y) and 48F2($x+1$, y+1) to affect the impedance of the coil 48F1($x, y$).

In addition, the same applies to the case where the power transmission circuit 30 applies an AC voltage to any of the coils 48F1($x-1$, y+1), 48F2($x-1$, y), 48F2($x, y+1$), 48F2($x, y$), 48F1($x, y+1$), 48F1($x+1$, y) and 48F2($x+1$, y+1) other than the coil 48F1($x$).

As described above, in the eleventh embodiment, it is difficult for the electric power supplied to the coil 48F1($x, y$) to leak to the other coils. Consequently, it becomes possible to suppress loss of the supplied electric power. In addition, it should be noted that the shield 47 may not be provided in each power transmission coil units 40U($x$).

Twelfth Embodiment

Figure 15:
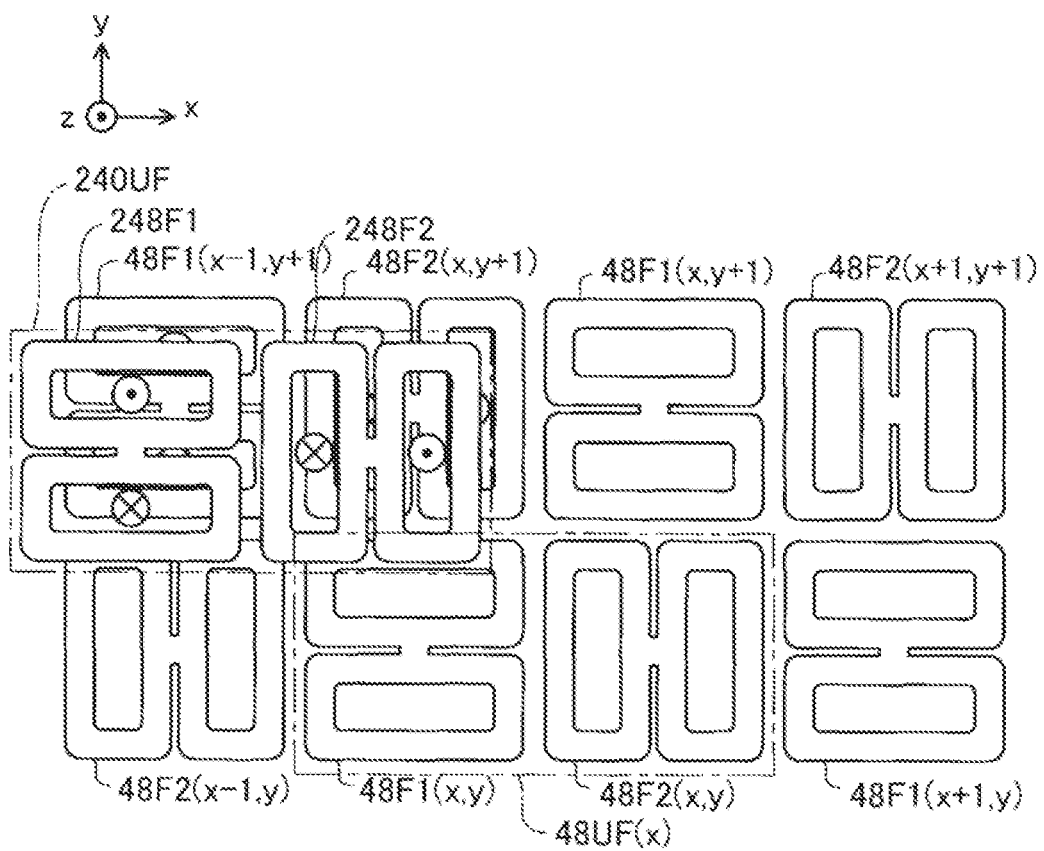
FIG. 15 is an explanatory diagram illustrating a power transmission coil unit according to a twelfth embodiment.

As shown in FIG. 15, in the twelfth embodiment, the vehicle 202-side power reception coil unit 240UF is added to the power transmission coil unit 40UF(x, y) described in the eleventh embodiment. In addition, in FIG. 15, no shield 47 is provided in the power transmission coil unit 40UF(x, y). However, it should be noted that the power transmission coil unit 40UF(x, y) may have a shield 47 provided therein. The vehicle 202-side power reception coil unit 240UF includes a pair of coils 248F1 and 248F2 having the same configuration as the coils 48F1($x, y$) and 48F2($x, y$) of the power transmission coil unit 40UF(x, y). The coil 248F2 is arranged adjacent to and on the +x side of the coil 248F1. In addition, the coils 248F1 and 248F2 of the power reception coil unit 240UF may be different in shape and size from the coils 48F1($x, y$) and 48F2($x, y$) of the power transmission coil unit 40UF($x$). It should be noted that the vehicle 202 may include a plurality of power reception coil units 240UF.

In the twelfth embodiment, as in the eleventh embodiment, it is difficult for the electric power supplied to the coil 48F1($x$) to leak to the other coils; therefore, it is possible to suppress loss of the supplied electric power.

Moreover, in the twelfth embodiment, it is possible to suppress electromagnetic coupling between the coils 248F1 and 248F2 of the power reception coil unit 240UF. That is, it is possible to suppress the electric power supplied to the coil 248F1 from leaking to the coil 248F2. In addition, in the case of transmitting electric power regenerated in the vehicle 202 to the power transmission coil unit 40UF(x, y) using the power reception coil unit 240U, it is also possible to suppress the electric power supplied to the coil 248F1 from leaking to the coil 248F2.

Furthermore, in the twelfth embodiment, the vehicle 202 can be continuously supplied with electric power even when the power reception coil unit 240UF moves in the x direction with movement of the vehicle 202. The same applies to the case where the power reception coil unit 240UF moves in the y direction with movement of the vehicle 202.

Thirteenth Embodiment

Figure 16A:
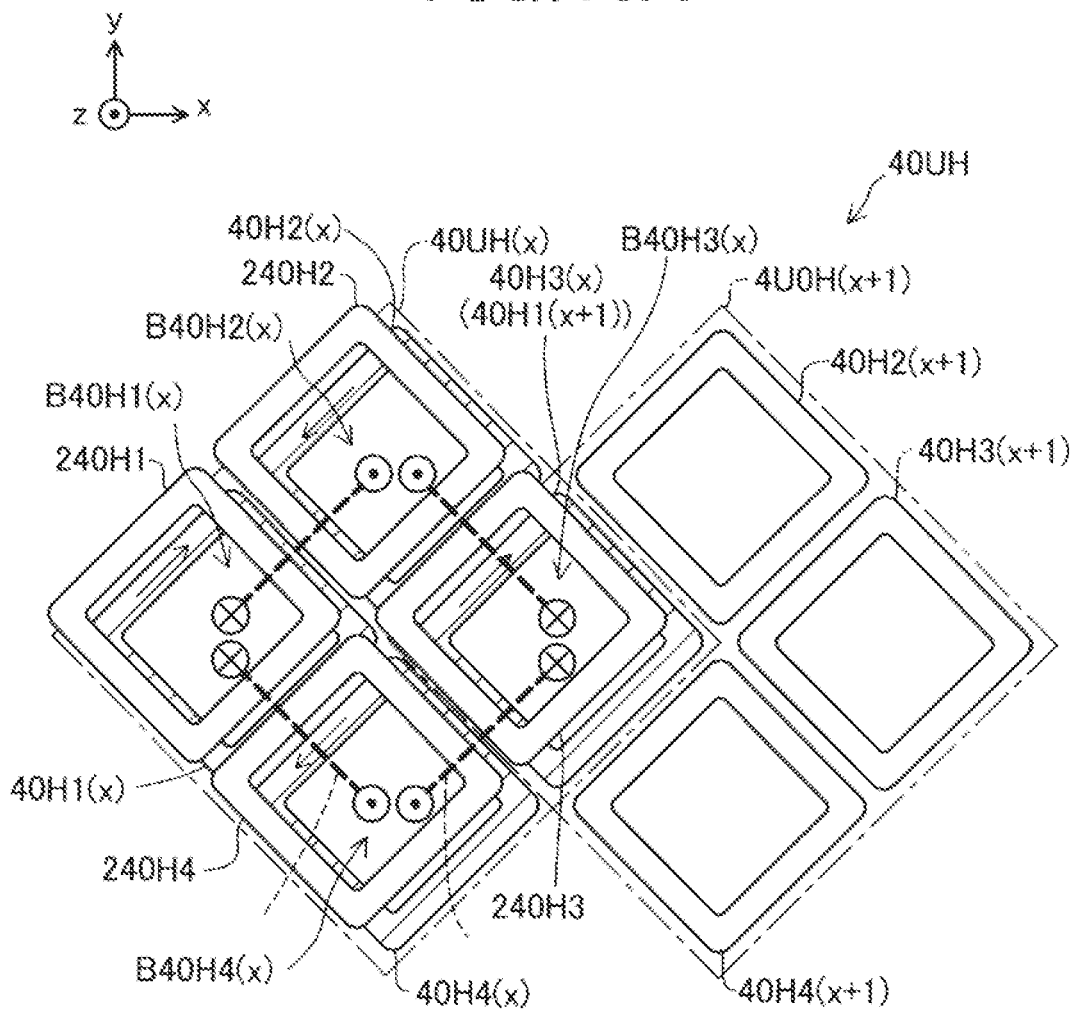
FIG. 16A is an explanatory diagram illustrating a power transmission coil unit according to a thirteenth embodiment.
Figure 16B:
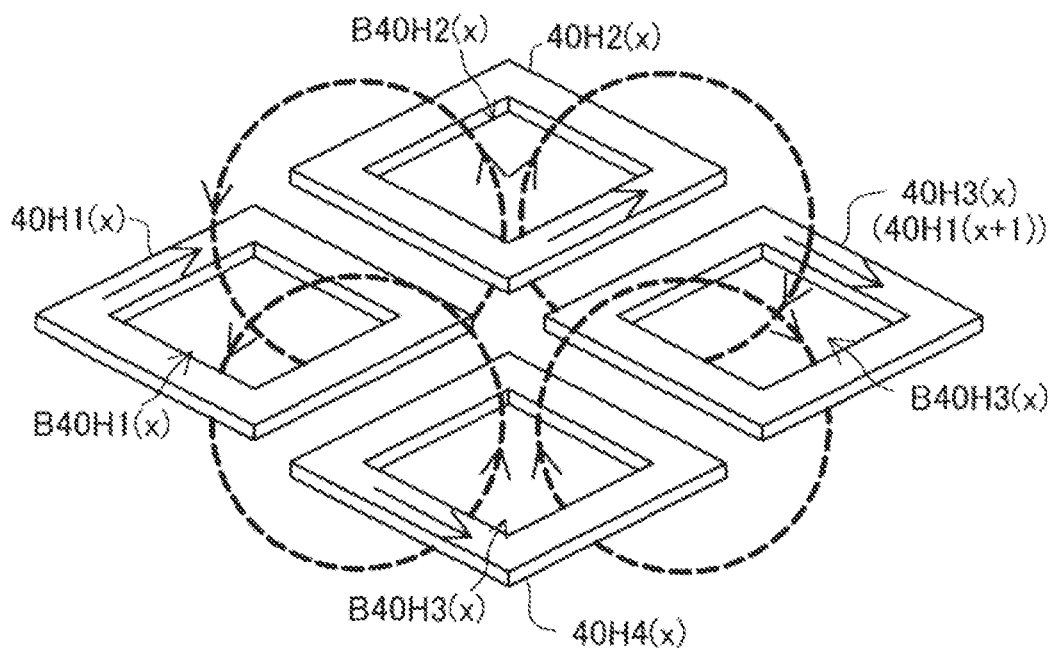
FIG. 16B is another explanatory diagram illustrating the power transmission coil unit according to the thirteenth embodiment.

As shown in FIGS. 16A and 16B, in the thirteenth embodiment, the power supply apparatus 100 includes a plurality of power transmission coil units 40UH($x$) arranged in the x direction. Each power transmission coil unit 40UH($x$) includes four coils 40H1($x$), 40H2($x$), 40H3($x$) and 40H4($x$). All the four coils 40H1($x$), 40H2($x$), 40H3($x$) and 40H4($x$) are arranged on an x-y plane; and the coils 40H1($x$), 40H2($x$), 40H3($x$) and 40H4($x$) are located respectively on the −x side, the +y side, the +x side and the −y side as viewed from the center of all the four coils. Similarly, the power transmission coil unit 40UH($x+1$) includes four coils 40H1($x+1$), 40H2($x+1$), 40H3($x+1$) and 40H4($x+1$). All the four coils 40H1($x+1$), 40H2($x+1$), 40H3($x+1$) and 40H4($x+1$) are arranged on the x-y plane; and the coils 40H1($x+1$), 40H2($x+1$), 40H3($x+1$) and 40H4($x+1$) are located respectively on the −x side, the +y side, the +x side and the −y side as viewed from the center of all the four coils. Here, the coil 40H3($x$) and the coil 40H1($x+1$) are the same coil shared by both the power transmission coil units 40UH($x$) and 40UH($x+1$). As above, each coil shared by two power transmission coil units is designated by two reference signs associated with the reference signs designating the two power transmission coil units.

On the other hand, the power reception coil unit 240UH includes four coils 240H1, 240H2, 240H3 and 240H4. All the four coils 240H1, 240H2, 240H3 and 240H4 are arranged on an x-y plane; and the coils 240H1, 240H2, 240H3 and 240H4 are located respectively on the −x side, the side, the +x side and the −y side as viewed from the center of all the four coils. In addition, the coils of the power reception coil unit 240UH may be different in shape and size from the coils of the power transmission coil unit 40UH(x). It should be noted that the vehicle 202 may include a plurality of power reception coil units 240UH.

Suppose that the power transmission circuit 30 applies an AC voltage to the power transmission coil unit 40UH(x). For example, as shown in FIGS. 16A and 16B, the power transmission circuit 30 causes electric current to flow clockwise through the coils 40H1(x) and 40H3(x) as viewed from the −z side, while causing electric current to flow counterclockwise through the coils 40H2(x) and 40H4(x) as viewed from the +z side. In this case, magnetic fluxes B40H1(x) and B40H3(x) are generated respectively inside the coils 40H1(x) and 40H3(x) to flow from the +z side to the −z side, while magnetic fluxes B40H2(x) and B40H4(x) are generated respectively inside the coils 40H2(x) and 40H4(x) to flow from the −z side to the +z side. Consequently, closed magnetic fluxes are formed as shown in FIG. 16B. It is difficult for the closed magnetic fluxes to pass through other coils; therefore, induced current is hardly generated in the power transmission coil unit 40H1(x+1). Moreover, it is difficult for the coils 40H2(x+1), 40H3(x+1) and 40H4(x+1) of the power transmission coil unit 40UH(x+1) to be electromagnetically coupled to the coils 40H1(x), 40H2(x), 40H3(x) and 40H4(x) of the power transmission coil unit 40UH(x); therefore, it is difficult for the coils 40H2(x+1), 40H3(x+1) and 40H4(x+1) to affect the impedances of the coils 40H1(x), 40H2(x), 40H3(x) and 40H4(x).

As described above, in the thirteenth embodiment, it is difficult for the electric power supplied to the power transmission coil unit 40UH(x) to leak to the other coil units; therefore, it is possible to suppress loss of the supplied electric power.

It should be noted that in the thirteenth embodiment, the power transmission coil units 40UH may be arranged two-dimensionally on the x-y plane.

Fourteenth Embodiment

Figure 17:
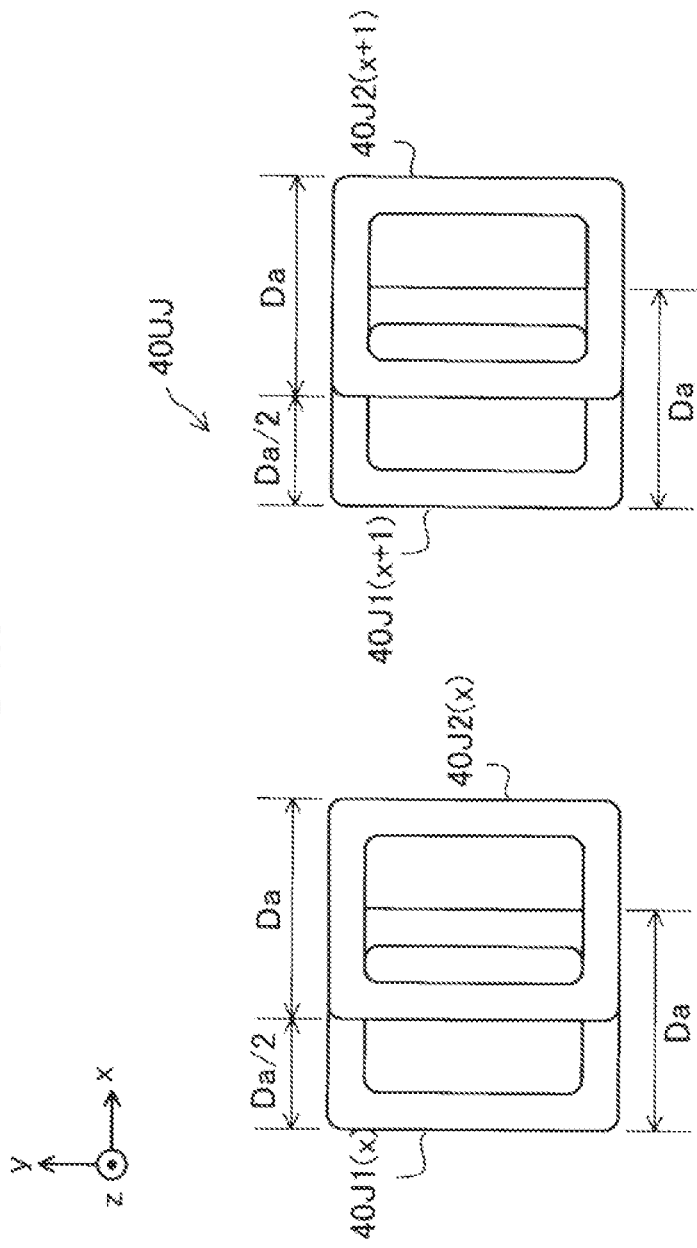
FIG. 17 is an explanatory diagram illustrating a power transmission coil unit according to a fourteenth embodiment.

FIG. 17 illustrates the configuration of power transmission coil units 40UJ(x) according to the fourteenth embodiment. Each power transmission coil unit 40UJ(x) includes a pair of coils 40J1(x) and 40J2(x). The coil 40J2(x) is offset from the coil 40J1(x) by Da/2 in the x direction, where Da is the size of the coils 40J1(x) and 40J2(x) in the x direction.

Figure 18:
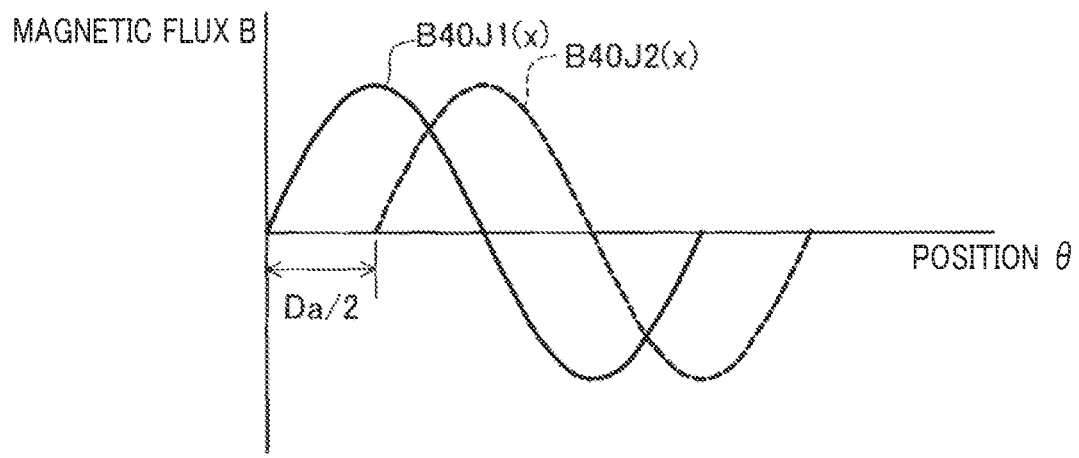
FIG. 18 is a graph illustrating the relationship between position and magnetic fluxes generated inside coils of the power transmission coil unit according to the fourteenth embodiment.

FIG. 18 shows changes in magnetic fluxes B40J1(x) and B40J2(x), which are generated respectively inside the coils 40J1(x) and 40J2(x), with position in the x direction. As shown in FIG. 18, the waveform of the magnetic flux B40J1(x) generated inside the coil 40J1(x) and the waveform of the magnetic flux B40J2(x) generated inside the coil 40J2(x) are offset from each other by π/2 in electrical angle. That is, when the magnetic flux B40J1(x) generated inside the coil 40J1(x) is at its maximum or its minimum, the magnetic flux B40J2(x) generated inside the coil 40J2(x) is substantially zero; and when the magnetic flux B40J2(x) generated inside the coil 40J2(x) is at its maximum or its minimum, the magnetic flux B40J1(x) generated inside the coil 40J1(x) is substantially zero. Therefore, when the power transmission circuit 30 supplies electric power to the coil 40J1(x), the magnetic flux B40J1(x) passing through the coil 40J2(x) in a power supply standby state is substantially zero; and when the power transmission circuit 30 supplies electric power to the coil 40J2(x), the magnetic flux B40J2(x) passing through the coil 40J1(x) in a power supply standby state is substantially zero. Consequently, it is difficult for the electric power supplied to the coil 40J1(x) to leak to the coil 40J2(x); and it is difficult for the electric power supplied to the coil 40J2(x) to leak to the coil 40J1(x). Moreover, it is difficult for the coils 40J1(x) and 40J2(x) to be electromagnetically coupled to each other; therefore, it is difficult for the coils 40J1(x) and 40J2(x) to mutually affect the impedances thereof.

As described above, in the fourteenth embodiment, it is possible to suppress loss of the supplied electric power.

Fifteenth Embodiment

As shown in FIGS. 19 to 22, a coil unit 40UK according to the fourteenth embodiment includes a pair of coils 40K1 and 40K2. The coil 40K1 is arranged along an x-y plane; and the coil 40K2 is arranged along a z-x plane and on the +x side of the coil 40K1.

Figure 19:
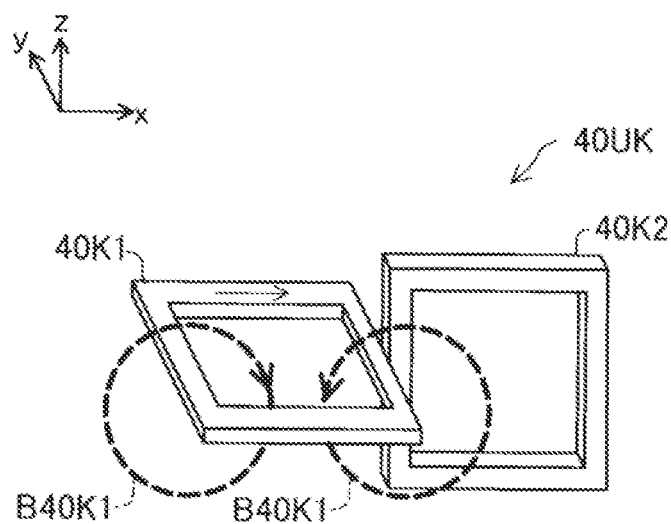
FIG. 19 is an explanatory diagram illustrating a power transmission coil unit according to a fifteenth embodiment.
Figure 20:
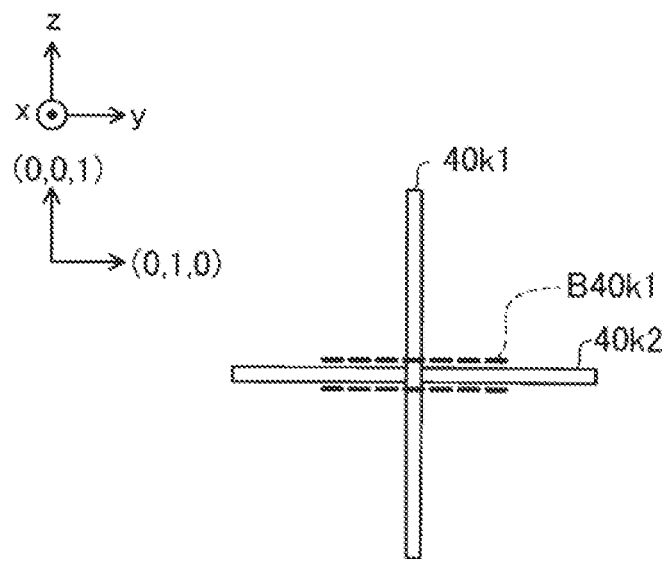
FIG. 20 is a view, from a +x side, of the power transmission coil unit according to the fifteenth embodiment.

Suppose that the power transmission circuit 30 applies an AC voltage to the coil 40K1. For example, as shown in FIG. 19, the power transmission circuit 30 causes electric current to flow clockwise through the coil 40K1 as viewed from the +z side. Consequently, magnetic flux B40K1 is generated inside the coil 40K1. The magnetic flux B40K1 is closed magnetic flux that passes through the inside of the coil 40K1 from the +z side to the −z side, and flows from the −z side to the +z side on the outside of the coil 40K1. On the other hand, when the power transmission circuit 30 causes electric current to flow counterclockwise through the coil 40K1 as viewed from the +z side; the direction of magnetic flux B40K1 generated inside the coil 40K1 is opposite to that shown in FIG. 19. Specifically, in this case, the magnetic flux B40K1 is closed magnetic flux that passes through the inside of the coil 40K1 from the −z side to the +z side, and flows from the +z side to the −z side on the outside of the coil 40K1. As shown in FIG. 20, on the +x side of the coil 40K1, the magnetic flux B40K1 is parallel to the z-x plane. That is, during the electric power transfer using the coil 40K1, the magnetic flux B40K1 which is generated by the coil 40K1 at the location where the coil 40K2 is present, intersects the central axis direction of the coil 40K2 at 90°. Therefore, it is difficult for the magnetic flux B40K1 pass through the coil 40K2. Hence, when the power transmission circuit 30 applies the AC voltage to the coil 40K1, induced current is hardly generated in the coil 40K2; and it is difficult for the electric power supplied to the coil 40K1 to leak to the coil 40K2. Moreover, it is difficult for the coil 40K2 to be electromagnetically coupled to the coil 40K1; therefore, it is difficult for the coil 40K2 to affect the impedance of the coil 40K1. In addition, although it is preferable for the angle made by the magnetic flux B40K1 with the central axis direction of the coil 40K2 to be 90° that is the maximum angle, the magnetic flux B40K1 may intersect the central axis direction of the coil 40K2 at any inclination angle greater than or equal to, for example, 45°.

Figure 21:
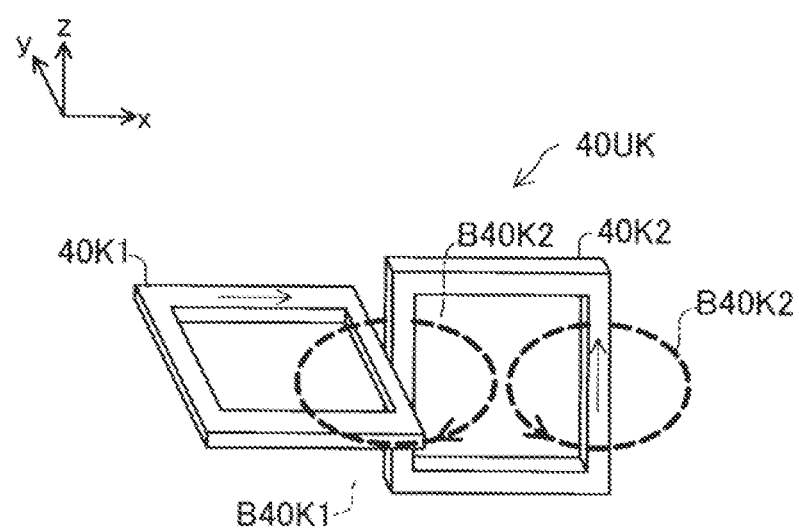
FIG. 21 is another explanatory diagram illustrating the power transmission coil unit according to the fifteenth embodiment.
Figure 22:
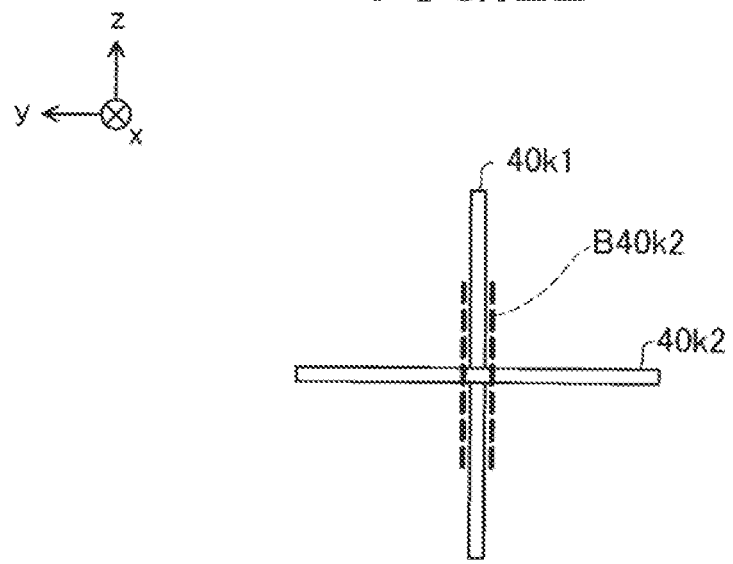
FIG. 22 is a view, from a −x side, of the power transmission coil unit according to the fifteenth embodiment.

Next, suppose that the power transmission circuit 30 applies an AC voltage to the coil 40K2. For example, as shown in FIG. 21, the power transmission circuit 30 causes electric current to flow clockwise through the coil 40K2 as viewed from the +y side. Consequently, magnetic flux B40K2 is generated inside the coil 40K2. The magnetic flux B40K2 is closed magnetic flux that passes through the inside of the coil 40K2 from the +y side to the −y side, and flows from the −y side to the +y side on the outside of the coil 40K2. On the other hand, when the power transmission circuit 30 causes electric current to flow counterclockwise through the coil 40K2 as viewed from the +y side, the direction of magnetic flux B40K2 generated inside the coil 40K2 is opposite to that shown in FIG. 21. Specifically, in this case, the magnetic flux B40K2 is closed magnetic flux that passes through the inside of the coil 40K2 from the −y side to the +y side, and flows from the +y side to the −y side on the outside of the coil 40K2. As shown in FIG. 22, on the −x side of the coil 40K2, the magnetic flux B40K2 is parallel to the x-y plane. That is, during the electric power transfer using the coil 40K2, the magnetic flux B40K2, which is generated by the coil 40K2 at the location where the coil 40K1 is present, intersects the central axis direction of the coil 40K1 at 90°. Therefore, it is difficult for the magnetic flux B40K2 pass through the coil 40K1. Hence, when the power transmission circuit 30 applies the AC voltage to the coil 40K2, induced current is hardly generated in the coil 40K1; and it is difficult for the electric power supplied to the coil 40K2 to leak to the coil 40K1. Moreover, it is difficult for the coil 40K1 to be electromagnetically coupled to the coil 40K2; therefore, it is difficult for the coil 40K1 to affect the impedance of the coil 40K2. In addition, although it is preferable for the angle made by the magnetic flux B40K2 with the central axis direction of the coil 40K1 to be 90° that is the maximum angle, the magnetic flux B40K2 may intersect the central axis direction of the coil 40K1 at any inclination angle greater than or equal to, for example, 45°.

As described above, in the fifteenth embodiment, it is possible to suppress loss of the supplied electric power.

Figure 23:
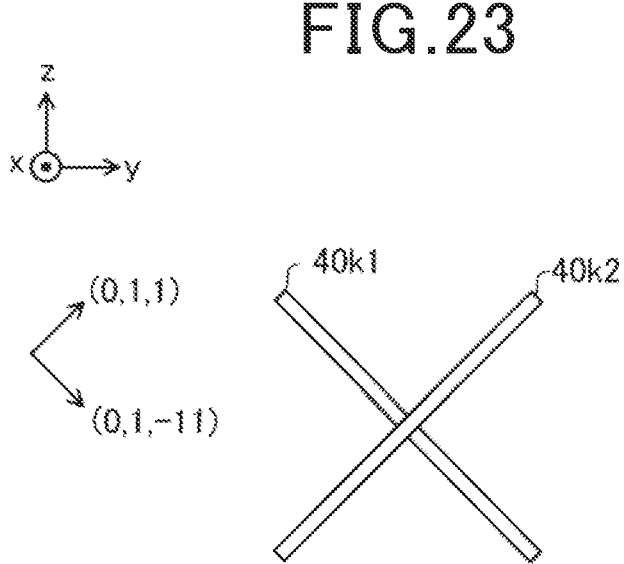
FIG. 23 is a view, from the +x side, of the power transmission coil unit according to the fifteenth embodiment in a state of having been rotated by 45°.

In addition, as described above, in the fifteenth embodiment, the coil 40K1 is arranged along the x-y plane; and the coil 40K2 is arranged along the z-x plane. That is, the direction of a normal vector of the coil 40K1 is (0, 0, 1); and the direction of a normal vector of the coil 40K2 is (0, 1, 0). However, as shown in FIG. 23, the coils 40K1 and 40K2 may be rotated together by 45° about the x axis so that: the direction of a normal vector of the coil 40K1 is (0, 1, 1); and the direction of a normal vector of the coil 40K2 is (0, 1, −1).

The present disclosure is not limited to the above-described embodiments, and can be implemented in various configurations without departing from the gist of the present disclosure. For example, technical features of the embodiments corresponding to technical features in each aspect described in the "summary of the invention" section may be replaced or combined as appropriate in order to solve some or all of the above-described problems or achieve some or all of the above-described advantageous effects. Moreover, the technical features may be deleted as appropriate unless they are described as essential in the present description.

What is claimed is:

1. A coil unit for supplying electric power to a moving object, the coil unit comprising:
    a plurality of coils for electric power transfer, the plurality of coils including a first coil and a second coil adjacent to the first coil in a moving direction of the moving object; and
    a magnetic flux reduction structure that reduces, during electric power transfer using the first coil, magnetic flux by which the first coil causes an induced voltage or induced current to be generated in the second coil,
    wherein:
    the first coil includes a first coil section that generates magnetic flux in a first direction, and a second coil section that generates magnetic flux in a second direction opposite to the first direction;
    the magnetic flux reduction structure comprises a structure where the first coil and the second coil are arranged so that the magnetic fluxes, which are generated respectively by the first and second coil sections of the first coil at a location where the second coil is present, at least partially cancel each other out;
    the first coil section and the second coil section are identical in shape and number of turns to each other;
    the first coil section and the second coil section are connected in series with each other;
    the second coil includes a third coil section that generates, during the electric power transfer, magnetic flux in a third direction, and a fourth coil section that generates, during the electric power transfer, magnetic flux in a fourth direction opposite to the third direction;
    the third coil section and the fourth coil section are identical in shape and number of turns to each other;
    the third coil section and the fourth coil section are connected in series with each other; and
    a direction in which the first and second coil sections of the first coil are aligned and a direction in which the third and fourth coil sections of the second coil are aligned intersect or are skewed with respect to each other.

2. The coil unit as set forth in claim 1, wherein at least one of the first coil and the second coil has a shield arranged on an outer periphery thereof.

3. The coil unit as set forth in claim 1, further comprising shields arranged respectively on outer peripheries of the first and second coils so as to surround them.

4. A contactless power supply system comprising:
    a moving object;
    a plurality of coil units as set forth in claim 1, the plurality of coil units being provided in an area where the moving object moves; and
    a power transmission circuit that performs, using the plurality of coil units, the electric power transfer to the moving object,
    wherein
    the moving object includes a power reception coil unit that couples with at least one of the first coils of the plurality of coil units to receive the electric power transferred from the at least one of the first coils.

* * * * *